US011829359B1

(12) United States Patent
Emani et al.

(10) Patent No.: US 11,829,359 B1
(45) Date of Patent: Nov. 28, 2023

(54) SYSTEM AND METHOD FOR SCALABLE DATA PROCESSING OPERATIONS

(71) Applicant: Microsoft Technology Licensing, LLC, Redmond, WA (US)

(72) Inventors: Kameswara Venkatesh Emani, Madison, WI (US); Avrilia Floratou, Sunnyvale, CA (US); Carlo Aldo Curino, Woodinville, WA (US); Karthik Saligrama Ramachandra, Bangalore (IN); Alekh Jindal, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/877,087

(22) Filed: Jul. 29, 2022

(51) Int. Cl.
*G06F 16/2455* (2019.01)
*G06F 16/2452* (2019.01)

(52) U.S. Cl.
CPC .... *G06F 16/24528* (2019.01); *G06F 16/2455* (2019.01)

(58) Field of Classification Search
CPC ........................ G06F 16/24528; G06F 16/2455
USPC .......................................................... 707/760
See application file for complete search history.

(56) References Cited

U.S. PATENT DOCUMENTS

| | | | | |
|---|---|---|---|---|
| 9,836,503 B2* | 12/2017 | Perry | ................. | G06F 16/24532 |
| 11,204,898 B1* | 12/2021 | Waas | ................... | G06F 16/156 |
| 11,475,001 B1* | 10/2022 | Waas | ................. | G06F 16/24534 |
| 11,586,625 B2* | 2/2023 | Kondiles | ........... | G06F 16/24542 |
| 11,625,414 B2* | 4/2023 | Waas | ................... | G06F 16/252 726/7 |
| 2005/0027651 A1* | 2/2005 | DeVault | ................. | G06Q 20/10 705/38 |
| 2006/0056413 A1* | 3/2006 | Ikeda | ..................... | G06F 9/546 370/428 |

(Continued)

OTHER PUBLICATIONS

"Anaconda_The World's Most Popular Data Science Platform", Retrieved from: https://web.archive.org/web/20220704160033/https://www.anaconda.com/, Jul. 4, 2022, 8 Pages.

(Continued)

*Primary Examiner* — Hanh B Thai
(74) *Attorney, Agent, or Firm* — Weaver IP L.L.C.

(57) ABSTRACT

Systems, methods, and devices are described for performing scalable data processing operations. A queue that includes a translatable portion comprising indications of data processing operations translatable to data queries and a non-translatable portion comprising indications of non-translatable data processing operations is maintained. A determination that a first data processing operation of a first code block statement is translatable to a database query is made. An indication of the first data processing operation is included in the translatable portion of the queue. Responsive to a determination that a second data processing operation of a second code block statement is undeferrable, the translatable portion of the queue is compiled into a database query. An execution of the database query to be executed by a database engine to generate a query result is caused. A result dataset corresponding to the query result is transmitted to an application configured to analyze the result dataset.

20 Claims, 9 Drawing Sheets

(56) References Cited

U.S. PATENT DOCUMENTS

| | | | | |
|---|---|---|---|---|
| 2008/0319959 A1* | 12/2008 | Bireley | G06F 11/3604 | |
| 2016/0092502 A1* | 3/2016 | Krishnamurthy | G06F 16/2428 | 707/691 |
| 2016/0110439 A1* | 4/2016 | Hrle | G06F 16/2358 | 707/600 |
| 2016/0117364 A1* | 4/2016 | Jahankhani | G06F 16/2438 | 707/760 |
| 2016/0292275 A1* | 10/2016 | Talton | G06F 16/835 | |
| 2016/0342645 A1* | 11/2016 | Tempero | G06F 16/258 | |
| 2017/0024572 A1* | 1/2017 | Ferraiolo | G06F 16/176 | |
| 2019/0220468 A1* | 7/2019 | Hrle | G06F 16/273 | |
| 2020/0251111 A1* | 8/2020 | Temkin | G06F 16/2423 | |
| 2021/0064588 A1 | 3/2021 | Fender et al. | | |
| 2021/0117316 A1* | 4/2021 | Jia | G06F 3/06 | |
| 2021/0294858 A1* | 9/2021 | Kondiles | G06F 16/90335 | |
| 2021/0303570 A1* | 9/2021 | Kondiles | H04L 45/02 | |
| 2021/0357409 A1* | 11/2021 | Rodriguez | G06F 40/157 | |
| 2022/0043690 A1* | 2/2022 | Kondiles | G06F 16/9027 | |
| 2022/0043755 A1* | 2/2022 | Kondiles | G06F 16/2455 | |
| 2022/0114176 A1* | 4/2022 | Kondiles | G06F 16/2455 | |

OTHER PUBLICATIONS

"Conda", Retrieved from: https://web.archive.org/web/20220701105329/https://docs.conda.io/en/latest/, Jul. 1, 2022, 2 Pages.

"Packages included in Anaconda 4.3.1 for Python version 3.6", Retrieved from: https://web.archive.org/web/20211007053629/https://docs.anaconda.com/anaconda/packages/old-pkg-lists/4.3.1/py36/, Oct. 7, 2021, 11 Pages.

"pandas", Retrieved from: https://web.archive.org/web/20220703113734/https://pandas.pydata.org/, Jul. 3, 2022, 3 Pages.

"pip documentation", Retrieved from: https://web.archive.org/web/20220704151500/https://pip.pypa.io/en/stable/, Jul. 4, 2022, 2 Pages.

"Virtual Environments and Packages", Retrieved from: https://web.archive.org/web/20220614060724/https://docs.python.org/3/tutorial/venv.html, Jun. 14, 2022, 3 Pages.

Jindal, et al., "Magpie: Python at Speed and Scale using Cloud Backends", In Proceedings of 11th Annual Conference on Innovative Data Systems Research, Jan. 10, 2021, 9 Pages.

"International Search Report and Written Opinion Issued in PCT Application No. PCT/US23/022795", dated Sep. 13, 2023, 12 Pages.

* cited by examiner

500

600

700

SYSTEM AND METHOD FOR SCALABLE DATA PROCESSING OPERATIONS

CROSS-REFERENCE TO RELATED APPLICATIONS

This application claims priority to India Provisional Application No. 202241035901, filed on Jun. 22, 2022, entitled "System and Method for Scalable Data Processing Operations," which is incorporated by reference herein in its entirety.

BACKGROUND

Data in a dataset may be accessed using queries formulated according to a query language. A dataset may be stored, manipulated, and analyzed in various formats using a data processing operation implemented by a query. A data processing operation may be executed on a single dataset or across multiple datasets. Data processing operations may include, for example, operations for manipulating data in one or more datasets or operations for analyzing data in one or more datasets. For instance, data processing operations may include relational algebra operations (selection, projection, join, aggregation, etc.), linear algebra operations (transpose, dot product, etc.) and various other operations (plotting, time series operations, etc.). Data processing operations may also be referred to as "data science operations."

Various software tools exist that enable data scientists to perform other forms of data processing operations on datasets. For example, Pandas is an open-source software library written for the Python® programming language for data manipulation and analysis. A data scientist can import a Pandas library into a data science notebook or Python script to access various data structures and operations for manipulating datasets. Other software tools leveraged by data scientists for operating on datasets include NumPy, SciPy and Matplotlib Python libraries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and devices are described herein for scalable data processing. In one aspect, a code block processing engine is configured to process a sequence of statements of a code block. The statements include data processing operations. The code block processing engine includes an operation evaluator and an engine interface. The operation evaluator is configured to maintain a queue that includes a translatable portion comprising indications of data processing operations translatable to database queries and a non-translatable portion comprising indications of non-translatable data processing operations. The operation evaluator is further configured to determine that a first data processing operation of a first code block statement is translatable to a database query. The operation evaluator is further configured to include an indication of the first data processing operation in the translatable portion of the queue. The operation evaluator is further configured to, responsive to determining that a second data processing operation is undeferrable, compile the translatable portion of the queue into a database query. The engine interface is configured to cause the database query to be executed by a database engine to generate a query result and transmit a result dataset corresponding to the query result to an application configured to analyze the result dataset.

In a further example aspect, the operation evaluator is further configured to determine that a third data processing operation of a third code statement is not translatable to a database query, the third code block statement subsequent to the first code block statement and preceding the second code block statement. The operation evaluator is further configured to include an indication of the third data processing operation into the non-translatable portion of the queue. The engine interface is further configured to cause the third data processing operation to be executed by a data processing engine to generate a first data processing result. The engine interface is further configured to generate the result dataset based on the query result and the first data processing result.

In a further example aspect, an application is configured to import a library into a computer program under development (e.g., a data science notebook or a Python script). The library includes an operation evaluator and an engine interface. Based on the importing, code of the library may be referenced within the computer program under development to cause data processing operations to be included in the queue by the operation evaluator, to cause the translatable data portion of the queue to be compiled into the database query by the operation evaluator, and to cause the engine interface to cause the database query to be executed by the database engine to generate the query result.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
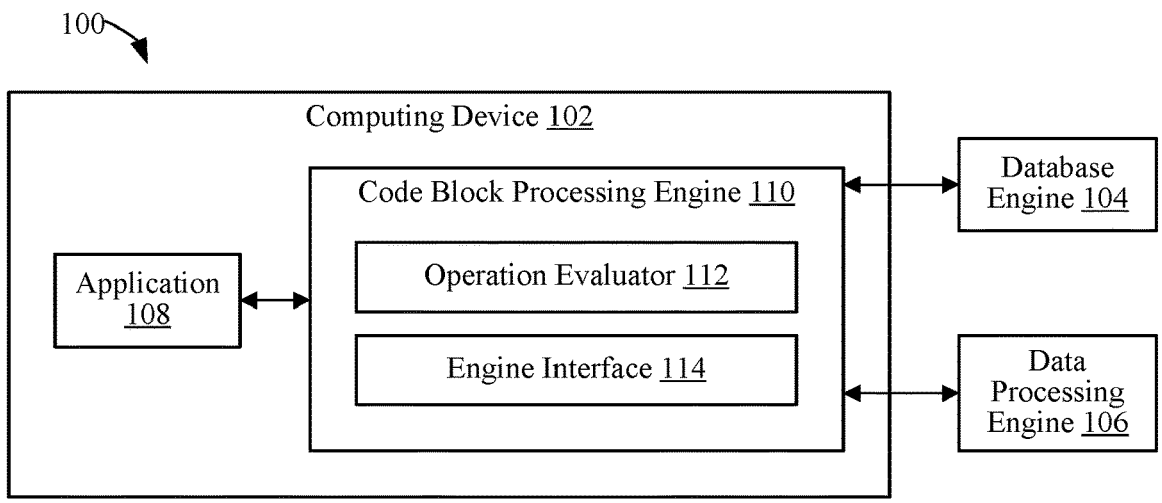
FIG. 1 is a block diagram of a system for performing scalable data processing operations, in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Scalable Data Processing Operations

Data in a dataset may be accessed using queries formulated according to a query language. A dataset may be stored, manipulated, and analyzed in various formats using a data processing operation implemented by a query. A dataset may comprise a labeled one-dimensional array (also referred to as a series), a labeled two-dimensional array (also referred to as a dataframe), or any other data structure used to organize data. A data processing operation is an operation configured to manipulate data of a target dataset. A data processing operation may be executed on a single dataset or across multiple datasets. Data processing operations may include, for example, operations for manipulating data in one or more datasets or operations for analyzing data in one or more datasets. For instance, data processing operations may include relational algebra operations (selection, projection, join, aggregation, etc.), linear algebra operations (transpose, dot product, etc.) and various other operations (plotting, time series operations, etc.). Data processing operations may also be referred to as "data science operations."

As described in the Background section, various software tools exist that enable data scientists to perform other forms of data processing operations on datasets. For example, Pandas is an open-source Python library that a data scientist can import into a data science notebook or Python script to access various data structures and operations for manipulating datasets. Other software tools leveraged by data scientists for operating on datasets include NumPy, SciPy and Matplotlib. However, these software tools have performance and scalability limitations, making it difficult for a data scientist to perform operations for manipulating large datasets. Performance of a computing device executing a workload drops when performing these operations, or the execution of the workload fails. Furthermore, performance limitations of software tools such as Pandas prevents leveraging hardware capabilities of some computing devices. At present, a data scientist must focus on a small sample of a larger dataset or utilize a framework in a cluster environment (e.g., Koalas, Dask, or Modin).

Existing frameworks have difficulties leveraging hardware capabilities of the data scientist's computer. For instance, a data scientist's computing device in one implementation includes a single node with limited random access memory (RAM), a multi-core central processing unit (CPU), and a graphics processing unit (GPU). Some existing frameworks may leverage multiple CPU cores; however, this is conditional on the availability of RAM. Existing frameworks may not be able to leverage the multi-core CPU due to the limited RAM of the computing device. As such, a computing device with a larger amount of RAM is used, a smaller sample of data is analyzed, or resources are micro-managed, each of which adds cost and/or adversely impacts productivity of the user.

Moreover, existing frameworks may not support Pandas application programming interfaces (APIs), making it difficult to integrate existing workloads and impacting data scientist productivity. Still further, a data scientist has to familiarize themselves with APIs used by the framework.

Embodiments described herein provide scalable data processing operations. In one aspect, a system includes a code block processing engine that interfaces with a database engine and data processing engine to perform scalable data processing operations. In another aspect, a system enables importing a library (e.g., a Python library) into a computer program under development (e.g., a data science notebook or Python script). The library enables the user to utilize a database engine and data processing engine to perform data processing operations. In either case, embodiments improve productivity of the user and shorten time to value by enabling broader adoption, providing interoperability, effectively using resources, providing easy installation, and simplifying workload migration. Several design considerations and benefits are described as follows.

Enabling Broader Adoption. Embodiments described herein may maintain functionality of the data processing engine they interface with. For example, a system interfacing with Pandas may utilize Pandas APIs to perform scalable data processing operations. In this context, the system includes functionality that examines a Pandas API and determines how to process the API, as described elsewhere herein.

Providing Interoperability. In certain implementations, a data processing operation may not be translatable into a database query. As used herein, a database query is a formal question formulated according to a query language for application to retrieve data from a dataset. A database query may be configured to perform a data processing operation used to retrieve particular data from a dataset. In this context, a system may be configured to determine whether or not a received data processing operation is translatable, and, depending on the determination, process the data processing operation for execution by a data processing engine (as-is) or by a database engine (as a database query).

Effectively Using Resources. Embodiments described herein may analyze large datasets while efficiently utilizing computing resources, without compromising performance for analyzing smaller datasets.

Providing Easy Installation. In a library implementation, the library may be installed using package managers (e.g., Package Installer for Python (PIP) or Conda®) on a local workstation without depending on an external database infrastructure. In certain implementations, the library is compatible with applications that utilize notebooks (e.g., Jupyter® computing platform, Kaggle™ data science and machine learning platform, etc.).

Simplifying Workload Migration. Embodiments enable migration of existing workloads in a manner that enables functionality described herein to be leveraged with respect to the existing workload. For instance, an existing Pandas project may be migrated to a system described herein with little modification to the code of the Pandas project.

Embodiments described herein provide scalable data processing operations by including indications of data processing operations to a queue. The queue includes a one or more indications of data processing operations that are translatable to database queries ("translatable data processing operations") and optionally one or more indications of data processing operations that are not translatable to database queries ("non-translatable data processing operations"). In this way, a queue may comprise a translatable portion and optionally a non-translatable portion.

Embodiments may be implemented in various ways. For instance, FIG. 1 is a block diagram of a system 100 for scalable data processing operations, in accordance with an embodiment. System 100 may be implemented on a single computing device or across multiple computing devices. A non-limiting example of a computing device that may be used to implement system 100 is described further below in reference to FIG. 11.

As shown in FIG. 1, system 100 includes a computing device 102, a database engine 104, and a data processing engine 106. Computing device 102 is configured to execute application 108 and code block processing engine 110 ("engine 110" herein), database engine 104 is configured to execute database queries, and data processing engine 106 is configured to execute data processing operations. As shown in FIG. 1, database engine 106 and data processing engine 108 may be external to computing device 102.

Alternatively, computing device 102 may be configured to execute logic to perform some or all of the functions of database engine 106 and/or data processing engine 108. For instance, some or all of such logic may be included in engine 110 or application 108. Furthermore, as shown in FIG. 1, engine 110 may be external to application 108. Alternatively, application 108 may include logic to perform some or all of the functions of engine 110.

Each component and subcomponent of system 100 may be communicatively coupled via one or more networks (not pictured in FIG. 1 for purposes of brevity). The network(s) may include, for example, one or more of a local area network (LAN), a wide area network (WAN), a personal area network (PAN), a private network, a public network, a packet network, a circuit-switched network, a wired network and/or a wireless network.

Application 108 comprises an application configured to submit data processing operations to engine 110. For example, application 108 may be an application for developing and/or executing computer programs. Application 108 may send data processing operations to engine 110 individually, as a statement that includes one or more data processing operations, or as a code block that includes a sequence of statements (e.g., a sequence of code block statements). In any case, each data processing operation may take one or more arguments and/or refer to one or more columns of data in a dataset as input data.

Engine 110 is configured to process a sequence of statements of a code block. Engine 110 may be a service executed by computing device 102 or implemented by application 108. Optionally, logic for performing some or all of the functions of engine 110 may be imported into a computer program (e.g., as a library), as described further below with respect to FIGS. 8 and 9. As shown in FIG. 1, engine 110 includes operation evaluator 112 and an engine interface 114. Operation evaluator 114 comprise logic for maintaining a queue, evaluating data processing operations of code block statements received by engine 110, including indications of data processing operations to a queue, compiling translatable portions of a queue into a database query, causing execution of non-translatable data processing operations by data processing engine 106, transmitting result datasets to application 108, and/or performing other functions associated with evaluating data processing operations, as described elsewhere herein.

Engine interface 114 comprises interfaces for communicating with database engine 104 and/or data processing engine 106 to execute database queries and data processing operations, respectively. For example, engine interface 114 may include an interface for communicating with database engine 104 and/or data processing engine 106 via a network, not shown in FIG. 1. Furthermore, engine interface 114 may be configured to manage results received from database engine 104 and/or data processing engine 106.

Figure 2:
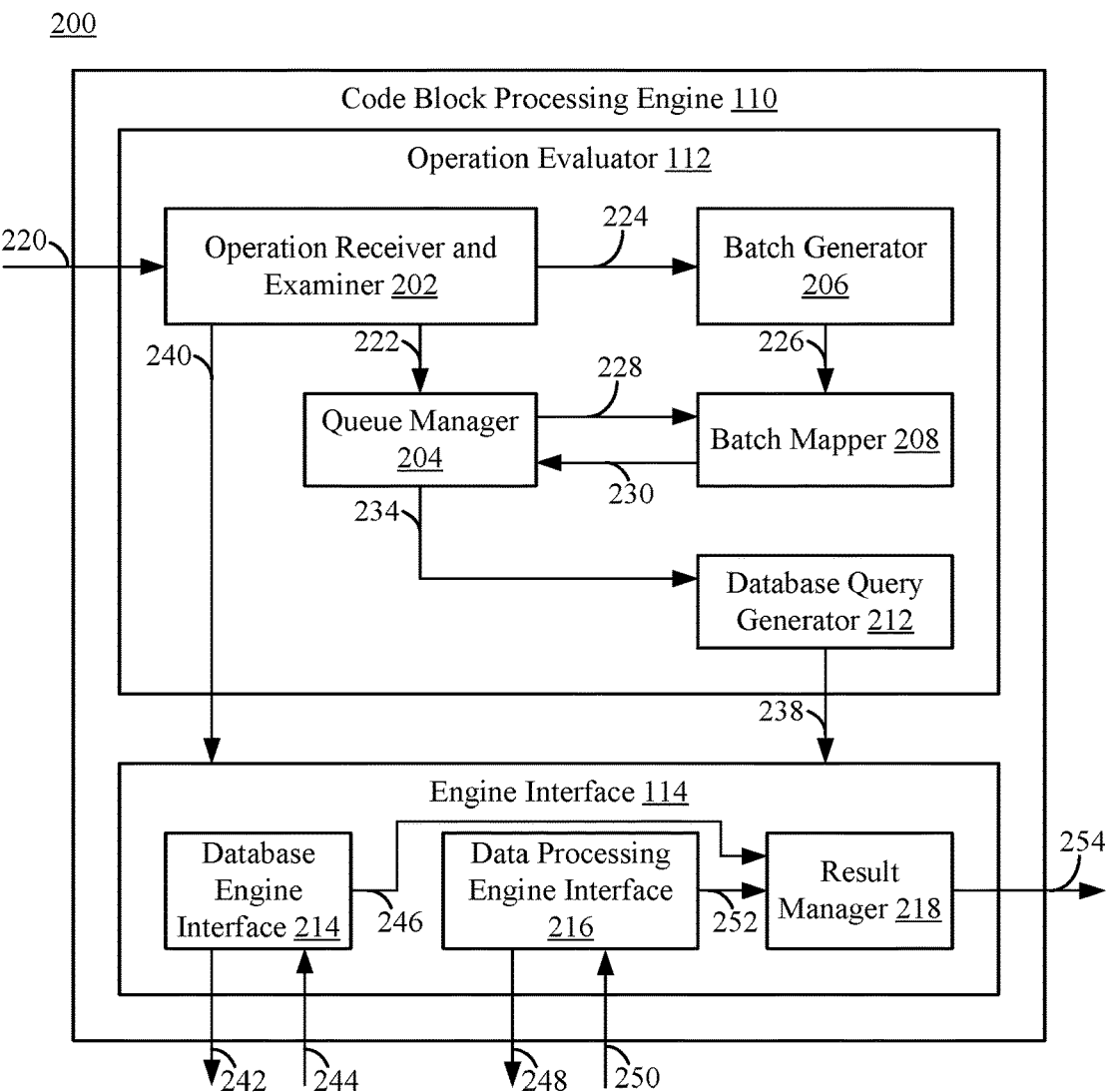
FIG. 2 is a block diagram of the code block processing engine of FIG. 1 in accordance with an embodiment.
Figure 3:
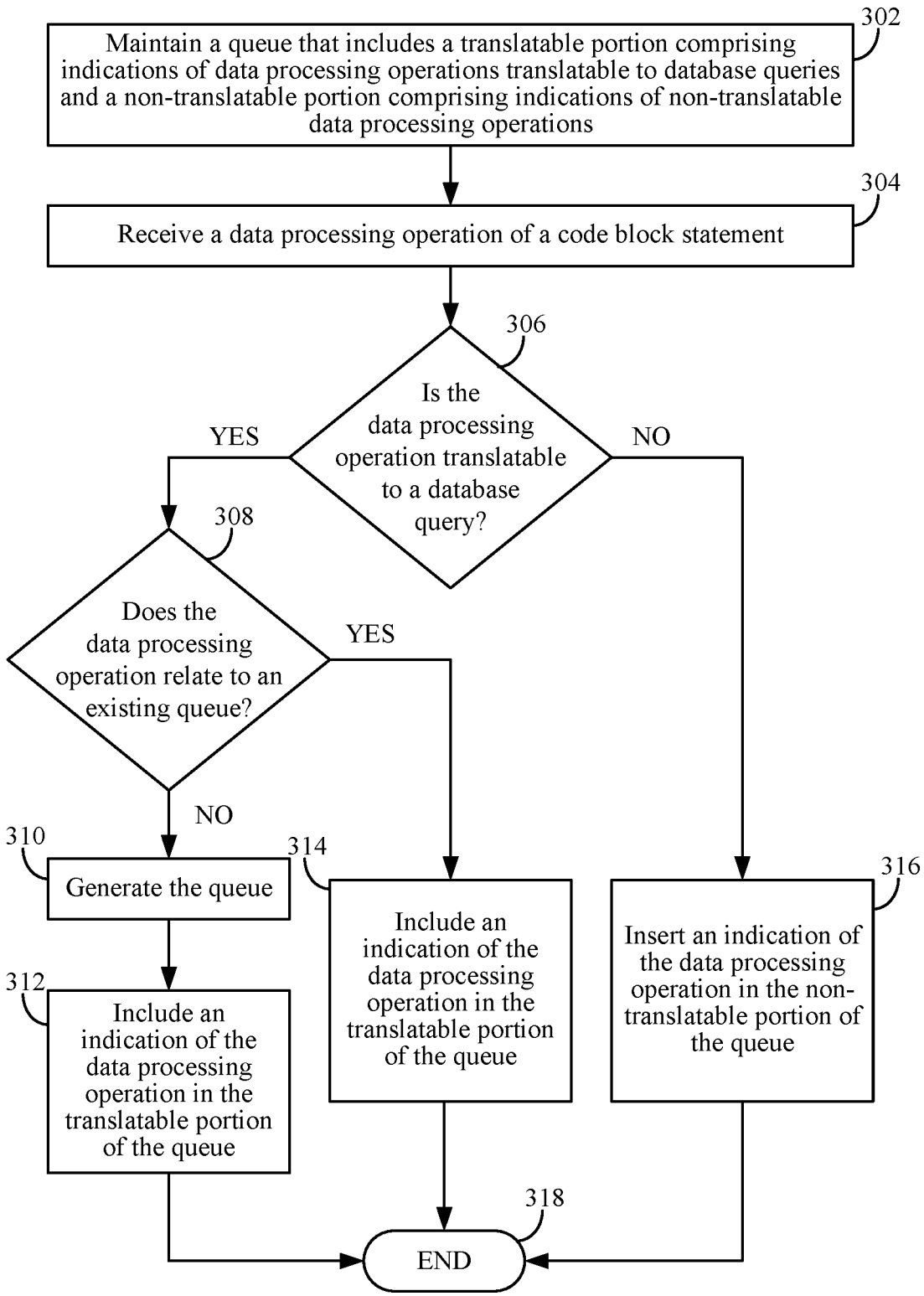
FIG. 3 depicts a flowchart of a process for including data processing operations in a queue, in accordance with an example embodiment.
Figure 4:
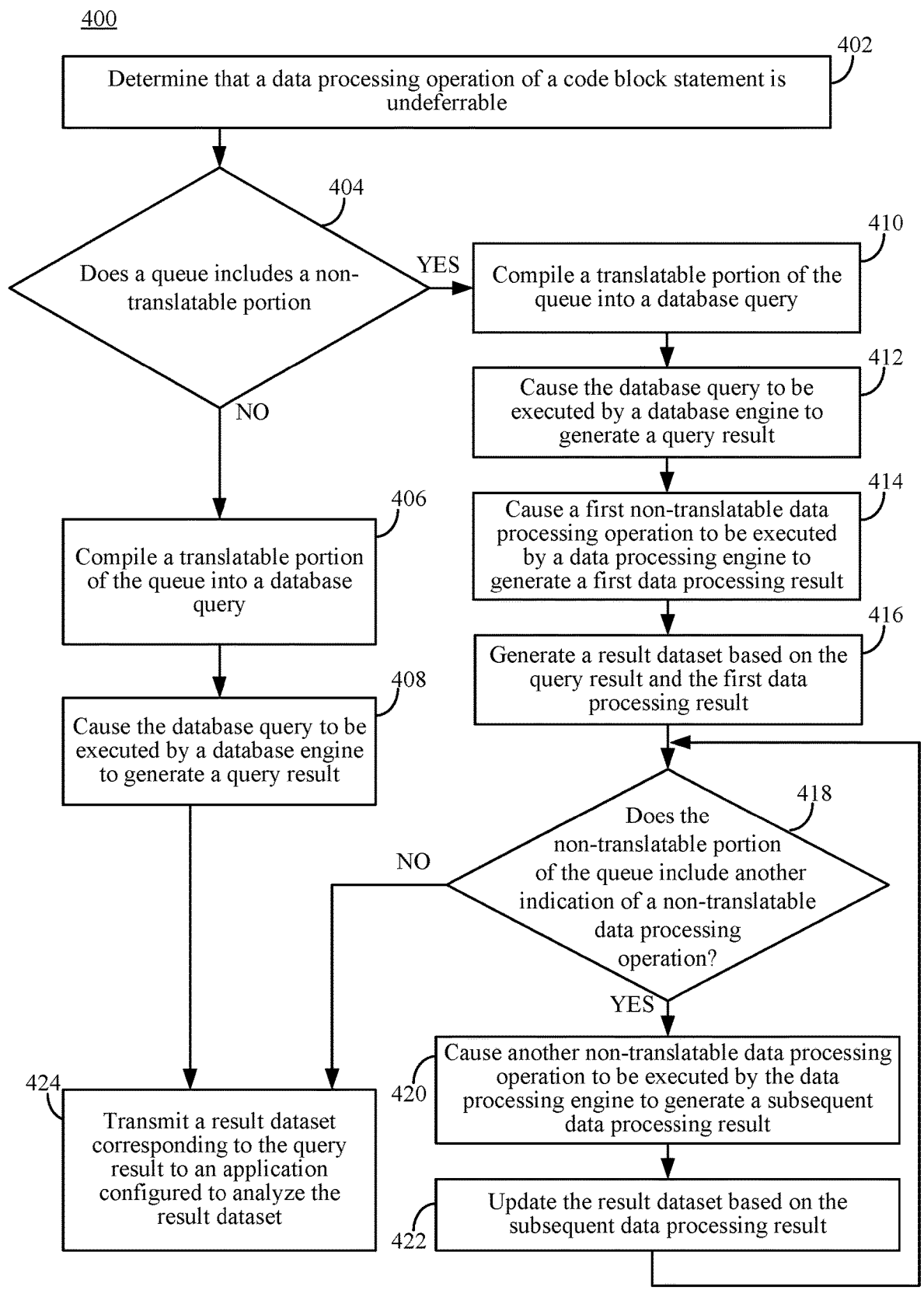
FIG. 4 depicts a flowchart of a process for determining a data processing operation is undeferrable, in accordance with an embodiment.

Engine 110 may be configured to evaluate operations and manage execution of operations in various ways, in embodiments. For example, FIG. 2 is a block diagram of engine 110 of FIG. 1, in accordance with an embodiment. As shown in FIG. 2, engine 110 includes operation evaluator 112 and engine interface 114, as described above with respect to FIG. 1. Operation evaluator 112 includes an operation receiver and examiner 202, a queue manager 204, a batch generator 206, a batch mapper 208, and a database query generator 212. Engine interface 114 includes a database engine interface 214, a data processing engine interface 216, and a result manager 218. For illustrative purposes, engine 110 is described below with respect to FIGS. 3 and 4. FIG. 3 depicts a flowchart 300 of a process for including an indication of a data processing operation to a queue, in accordance with an example embodiment, and FIG. 4 depicts a flowchart 400 of a process for determining that a data processing operation is undeferrable, in accordance with an embodiment. Engine 110 may operate according to flowcharts 300 and/or 400 in embodiments. Not all steps of flowcharts 300 and 400 need be performed in all embodiments. Further structural and operational embodiments will be apparent to persons skilled in the relevant art(s) based on the following description of FIGS. 2-4.

Depending on the implementation, any of operation receiver and examiner 202, queue manager 204, batch generator 206, batch mapper 208, database query generator 212, database engine interface 214, data processing engine interface 216, and/or result manager 218 may be implemented as services executing on the same computing device (e.g., computing device 102 of FIG. 1). Alternatively, any of the components or subcomponents of engine 110 may be executed on separate computing devices configured to communicate with each other over a network (e.g., one or more wired networks, one or more wireless networks, and/or a combination of wired and wireless networks). Further still, and as described with respect to FIGS. 8 and 9 below, any of the components or subcomponents of engine 110 may be implemented as logic or operations of a library that may be imported into a computer program.

As stated above, flowchart 300 is a flowchart of a process for including an indication of a data processing operation to a queue. Flowchart 300 begins with step 302. In step 302, a queue that includes a translatable portion and a non-translatable portion is maintained. The translatable portion comprises indications of data processing operations translatable to data queries and the non-translatable portion comprises indications of non-translatable data processing operations. For instance, queue manager 204 is configured to maintain a queue that includes indications inserted thereto according to steps 312, 314, and/or 316, as described below. In FIG. 3, flowchart 300 is depicted as beginning with step 302; however, it is also contemplated herein that the queue may not be created until after a data processing operation is received and analyzed by components of operation evaluator 112 (e.g., as described with respect to step 310 further below).

In step 304, a data processing operation is received. For example, operation receiver and examiner 202 of FIG. 2 is configured to receive a code block 220. Code block 220 may include a data processing operation, a statement that includes one or more data processing operations, a sequence of statements, and/or any other information associated with a data processing operation sent from application 108 of FIG. 1. Code block 220 may include an API of data processing engine 108 (e.g., a Pandas API).

In step 306, a determination of whether the data processing operation is translatable to a database query is made. For example, operation receiver and examiner 202 of FIG. 2 is configured to determine if the data processing operation included in code block 220 is translatable to a database query. For example, operation receiver and examiner 202 may determine if the functions and arguments of the data processing operation included in code block 220 have corresponding operations and operands in a database language of database engine 108 of FIG. 1. For instance, in an implementation that translates a Pandas operation to an SQL operation, operation receiver and examiner 202 may determine a function of the Pandas operation corresponds to an SQL operation. Furthermore, operation receiver and examiner 202 may determine that the Pandas operation is not translatable (e.g., the operation operates on a dataframe index, a function of the operation does not have a corresponding database operation, an argument of the operation is in a format that is not supported by the database engine, an argument of the operation does not have a corresponding operand of a database operation, and/or is otherwise not translatable tot a database query). If the data processing operation is translatable to a database query, operation receiver and examiner 202 generates a message 222 including the data processing operation and flowchart 300 proceeds to step 308. If the data processing operation is not translatable to a database query, operation receiver and examiner 202 generates a message 224 including the data processing operation and flowchart 300 proceeds to step 316. Alternatively, if the data processing operation is not translatable to a database query and not related to an existing queue managed by queue manager 204, operation receiver and examiner 202 may provide information 240 including the data processing operation to data processing engine interface 216 of engine interface 114. In this context, data processing engine interface 216 transmits the data processing operation to data processing engine 106 for execution thereof.

In step 308, a determination of whether the data processing operation relates to an existing queue is made. For example, queue manager 204 of FIG. 2 is configured to receive message 222 and determine whether the data processing operation included in message 222 relates to an existing queue (e.g., the queue maintained in step 302). For instance, queue manager 204 may compare an argument taken by the data processing operation to determine if the data processing operation relates to an existing queue. If the data processing operation does not relate to an existing queue, flowchart 300 proceeds to step 310. Otherwise, flowchart 300 proceeds to step 314.

In step 310, the queue is generated. For instance, queue manager 204 of FIG. 2 may be configured to generate a new queue if the data processing operation received in step 304 does not relate to an existing queue.

In step 312, an indication of the data processing operation is included in the translatable portion of the queue. For example, queue manager 204 of FIG. 2 is configured to include an indication of the data processing operation in a translatable portion of the queue. For instance, the queue generated in step 310 may be an expression tree. In this context, queue manager 204 may translate functions and/or arguments of the data processing operation into corresponding operands and/or operators of one or more database expressions. The expression tree may indicate relationships (e.g., dependencies) between database expressions. The expression tree may include a reference to another expression tree maintained by queue manager 204. After the indication is added to the queue, flowchart 300 ends with step 316.

In step 314, an indication of the data processing operation is included in the translatable portion of the queue. For example, queue manager 204 of FIG. 2 is configured to include (e.g., insert) an indication of the data processing operation to an existing queue. Step 314 may be performed in a manner similar to step 312. In one aspect, the data processing operation is related to another data processing operation already processed by operation evaluator 112 (e.g., a "previously processed data processing operation"). In this context, the indication included in the existing queue may indicate that the data processing operation is dependent on the previously processed data processing operation. An example of an indication indicating that a data processing operation is dependent on another data processing operation is described further below with respect to FIG. 10D. After the data processing operation is inserted into the existing queue, flowchart 300 ends with step 316.

In step 316, an indication of the data processing operation is inserted in the non-translatable portion of the queue. For example, batch mapper 208 of FIG. 2 is configured to include an indication of the data processing operation in the non-translatable portion of the queue maintained by queue manager 204. Non-translatable data processing operations may be inserted to queues in various ways. For instance, batch generator 206 of FIG. 2 is configured to generate a batch 226 representative of the non-translatable data processing operation included in message 224. Batch generator 206 may generate batch 226 by examining the data processing operation included in message 224, determining a function and one or more arguments of the data processing operation, and generating a batch indicative of the function and arguments therein. In a particular implementation, the batch is a batch triplet including a first element indicative of the function of the data processing operation, a second element indicative of positional arguments of the data processing operation, and a third element indicative of keyword arguments of the data processing operation.

With continued reference to step 316, batch mapper 208 of FIG. 2 may be configured to map batch 226 to a queue 228 to generate an updated queue 230. As shown in FIG. 2, batch mapper 208 may receive queue 228 from queue manager 204. Updated queue 230 includes an indication of the non-translatable data processing operation (e.g., batch 226 or an indication of batch 226). In an example embodiment implementing an expression tree as queue 228, batch mapper 208 may map batch 226 to an expression tree (e.g., queue 228) to generate (or update) a mixed expression tree. In this context, the mixed expression tree (e.g., updated queue 230) includes a declarative portion corresponding to translatable data process operations stored in queue 228 and an imperative portion corresponding to batches (e.g., batch 226) mapped to the declarative portion by batch mapper 208.

An example mixed expression tree is described further below with respect to FIG. 5. As described with respect to FIG. 5, the indication inserted in the non-translatable portion of the queue in step 316 may include an indication that the data processing operation (e.g., batch 226) is dependent on another data processing operation (e.g., a previously processed translatable and/or non-translatable data processing operation). After the indication of the data processing operation is added to the queue, flowchart 300 ends with step 316.

Generating and mapping non-translatable data processing operations, as described in step 316 above, enables engine 110 to lazily evaluate non-translatable data processing operations. This lazy evaluation of data processing operations may reduce resources used by engine 110 in executing data processing operations and/or enable system 100 to execute data processing operations against large datasets.

Flowchart 300 ends with step 316. Depending on the implementation, step 316 may include proceeding to evaluating another data processing operation in a statement or sequence of statements (i.e., returning to step 304 or 306 with respect to a subsequent data processing operation), causing an execution of a query result (e.g., as described further below with respect to FIG. 4), and/or otherwise completing the evaluation of the data processing operation received in step 302, as described herein.

Including indications of translatable data processing operations and/or non-translatable data processing operations in a queue enables systems and methods described herein to defer execution of database queries and data processing operations until a data processing operation that is undeferrable is processed by engine 110. In this context, engine 110 maintains the queue and adds indications of "deferrable" data processing operations to the queue without having to execute corresponding database queries or data processing operations. Deferrable data processing operations may include assigning values to variables, replacing values in a dataframe, adding columns to a dataframe, converting data formats, and/or any other operation that execution of may be deferred by engine 110. By deferring execution of data processing operations in this way, embodiments and techniques described herein may improve performance (e.g., by enabling a system to perform data processing operations on larger datasets and/or by utilizing less resources in performing data processing operations).

An undeferrable data processing operation is any data processing operation that execution is not deferrable. For instance, an undeferrable data processing operation may be a data processing operation that invokes a print function (e.g., "rep( )" function), invokes a function that returns a representation of an object (e.g., a "str( )" function that returns a string version of an object), and/or otherwise causes execution of the data processing operation to not be deferrable. Undeferrable data processing operations are described further below with respect to FIG. 4.

As stated above, flowchart 400 is a flowchart of a process for determining that a data processing operation is undeferrable. Flowchart 400 begins with step 402. In one aspect, step 402 is a further embodiment of step 318 of flowchart 300 of FIG. 3. In step 402, a determination that a data processing operation of a code block statement is undeferrable is made. For instance, operation receiver and examiner 202 of FIG. 2 may determine that a data processing operation included in code block 220 is undeferrable. For purpose of the following discussion, the data processing operation is referred to as the "undeferrable operation" hereinafter. As described herein, the undeferrable operation is included in the same code block (e.g., code block 220) as the data processing operation received in step 302 of FIG. 3. Alternatively, the undeferrable operation may be received in a subsequently received code block. In one aspect, operation receiver and examiner 202 of FIG. 2 may determine that the undeferrable operation is undeferrable as part of performing step 304 of FIG. 3. In this context, operation receiver and examiner 202 may include an indication that the undeferrable operation is undeferrable in message 222 or message 224. This indication may cause components of engine 110 to perform any of steps 404-424 as described herein (e.g., as sub-steps of or subsequent to step 316).

In step 404, a determination of whether the queue includes a non-translatable portion is made. For example, queue manager 204 of FIG. 2 is configured to determine whether the queue that includes an indication of the undeferrable operation (e.g., as added to the queue in accordance with one or more steps of flowchart 300) includes a non-translatable portion. If queue manager 204 determines the queue does not include a non-translatable portion, flowchart 400 proceeds to step 406. Otherwise, flowchart 400 proceeds to step 410. In any case, queue manager 204 is configured to transmit information 234 to database query generator 212. Information 234 may include an indication of the undeferrable operation, arguments of the undeferrable operation, the queue, an indication of whether the queue includes a non-translatable portion, and/or any other information associated with the undeferrable operation and/or the queue.

In step 406, a translatable portion of the queue is compiled into a database query. For example, database query generator 212 of FIG. 2 is configured to compile the translatable portion of the queue included in information 234 into database query 238. For instance, the translatable portion may be compiled into a structured query language (SQL) query or query formulated according to another query language. SQL is a query language and data manipulation language for relational databases. The database query may include one or more subqueries that correspond to operators and/or operands of respective data processing operations/database expressions and/or subexpressions.

In step 408, the execution of the database query by a database engine is caused to generate a query result. For example, database engine interface 214 of FIG. 2 transmits database query 238 to database engine 104 of FIG. 1 (e.g., as query 242, as shown in FIG. 2) and receives a query result 244 from database engine 104. Alternatively, engine 110 includes a database engine configured to execute database query 238 to generate query result 244. In an embodiment, query result 244 includes a result dataset. The result dataset may be a dataframe, a data series, and/or any other type of dataset corresponding to a result generated by database engine 104 executing query 242. In one aspect, database engine interface 214 provides information 246 to result manager 218 and flowchart 400 proceeds to step 424. Information 246 may include query result 244 and optionally any other data associated with the execution of query 242, code block 220, and/or information 234.

In step 410, a translatable portion of the queue is compiled into a database query. For example, database query generator 212 of FIG. 2 is configured to compile the translatable portion of the queue included in information 234 into database query 238. Database query may include one or more sub-queries that correspond to respective data processing operations and/or database expressions.

In step 412, the execution of the database query by a database engine is caused to generate a query result. For example, database engine interface 214 of FIG. 2 is configured to transmit database query 238 to database engine 104 of FIG. 1 (e.g., as query 242, as shown in FIG. 2) to generate query result 244. Alternatively, engine 110 includes a database engine configured to execute database query 238 to generate query result 244. In an embodiment, query result 244 includes a result dataset that may be a may be any type of dataset described elsewhere herein.

In step 414, an execution of a first non-translatable data processing operation by a data processing engine to generate a first data processing result is caused. For example, data processing engine interface 216 of FIG. 2 is configured to transmit a batch 248 to data processing engine 106 of FIG. 1 to cause data processing engine 106 to execute a data processing operation corresponding to batch 248 to generate first data processing result 250. Alternatively, engine 110 includes a data processing engine configured to execute a data processing operation corresponding to batch 248 to generate first data processing result 250. Data processing engine interface 216 may receive batch 248 from database query generator 212 or queue manager 204. First data processing result 250 may include any type of dataset described elsewhere herein, the result dataset corresponding to a result generated by data processing engine 106 executing a data processing operation corresponding to batch 248.

In step 416, a result dataset is generated based on the query result and the first data processing result. For example, result manager 218 of FIG. 2 is configured to receive information 246 from database engine interface 214 and information 252 from data processing engine interface 216. In this context, information 246 includes query result 244, generated as described above with respect to step 412, and information 252 includes first data processing result 250, generated as described above with respect to step 414. Result manager 218 is configured to generate a result dataset 254 based on query result 244 and first data processing result 250. For example, result manager 218 may combine query result 244 and first data processing result 250 to generate result dataset 254. Result dataset 254 may be any type of dataset described elsewhere herein.

In step 418, a determination of whether the non-translatable portion of the queue includes another indication of a non-translatable data processing operation is made. For instance, result manager 218 of FIG. 2 may be configured to determine whether the non-translatable portion of the queue includes another indication of a non-translatable data processing operation (e.g., another batch). Alternatively, another component of engine interface 114 or engine 110 may be configured to make the determination. If another indication of a non-translatable data processing operation is included, flowchart 400 proceeds to step 420. Otherwise, flowchart 400 proceeds to step 424.

In step 420, the execution of another non-translatable data processing operation by the data processing engine to generate a subsequent data processing result is caused. For example, data processing engine interface 216 of FIG. 2 may be configured to transmit another batch (not shown in FIG. 2) to data processing engine 106 of FIG. 1 to generate a subsequent data processing result. Alternatively, engine 110 includes a data processing engine configured to execute another batch to generate the subsequent data processing result. The batch may be a batch corresponding to a data processing operation that depends on a non-translatable data processing operation corresponding to a previously transmitted batch (e.g., batch 248) or a batch corresponding to a data processing operation that does not depend on another non-translatable data processing operation.

In step 422, the result dataset is updated based on the subsequent data processing result. For example, result manager 218 of FIG. 2 may be configured to receive information including the subsequent data processing result generated in step 420 (not shown in FIG. 2) and update result dataset 254 based on the subsequent data processing result. For instance, result manager 218 may combine (e.g., merge) the subsequent data processing result and result dataset 254, modify data within result dataset 254 based on the subsequent data processing result, and/or otherwise update result dataset 254 based at least on the subsequent data processing result.

As described above, steps 418-422 may be repeated for each indication of a non-translatable data processing operation (e.g., each batch) included in the non-translatable portion of the queue. If there are no other batches to execute, flowchart 400 proceeds to step 424.

Flowchart 400 ends with step 424. In step 424, a result dataset corresponding to the query result is transmitted to an application configured to analyze the result dataset. For example, result manager 218 of FIG. 2 is configured to transmit result dataset 254 to application 108 of FIG. 1. Alternatively, result manager 218 may be configured to transmit result dataset 254 to another application executed by computing device 102 (not shown in FIG. 1) or another component of system 100. Furthermore, result dataset 254 (or portions thereof) may be stored in memory and/or provided to a user (e.g., via a user interface).

Expression trees may be generated and visualized in various ways. As described above with respect to FIGS. 2-4, an expression tree may include expressions that are translatable to database queries (e.g., declarative expressions). Furthermore, an expression tree may be a mixed expression tree that includes one or more batches mapped to a declarative portion of the mixed expression tree. In this context, batches represent data processing operations that are not translatable to database queries. For example, FIG. 5 is a block diagram of an example mixed expression tree 500, in accordance with an example embodiment. In an embodiment, operation evaluator 112 may operate to generate mixed expression tree 500 (e.g., by performing steps of flowchart 300). Further structural and operational embodiments will be apparent to persons skilled in the relevant art(s) based on the following description of FIG. 5.

Figure 5:
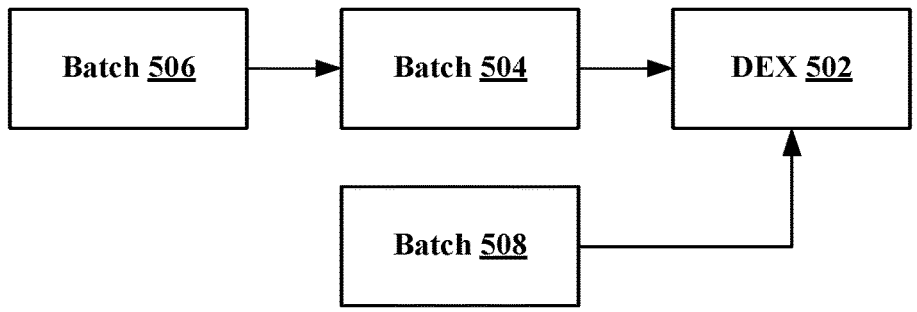
FIG. 5 is a block diagram of an example expression tree, in accordance with an example embodiment.

As shown in FIG. 5, mixed expression tree 500 includes a declarative expression 502 labeled "DEX 502" and batches 504-508, labeled "Batch 504", "Batch 506", and "Batch 508", respectively. DEX 502 is a translatable (e.g., "declarative") portion of mixed expression tree 500. DEX 502 may include one or more declarative expressions that are translatable to database queries for execution by a database engine (e.g., database engine 104 of FIG. 1).

Batch 504 and batch 508 are batches that are mapped to expressions of DEX 502. Batch 506 is a (e.g., child) batch that depends on (e.g., parent) batch 504. For instance, batches 504-508 may be mapped to DEX 502 by batch mapper 208, as described above with respect to FIGS. 2 and 3. Each of batches 504-508 may be include a function to be invoked against a result of the execution of an expression of DEX 502. Mixed expression tree 500 may be visualized in various ways. For example, mixed expression tree 500 may be visualized as a DEX 502 and a (e.g., ordered) list of batches 504-508. The ordered list may include information mapping each batch to a corresponding expression of DEX 502, parent batches, and/or child batches.

Figure 6:
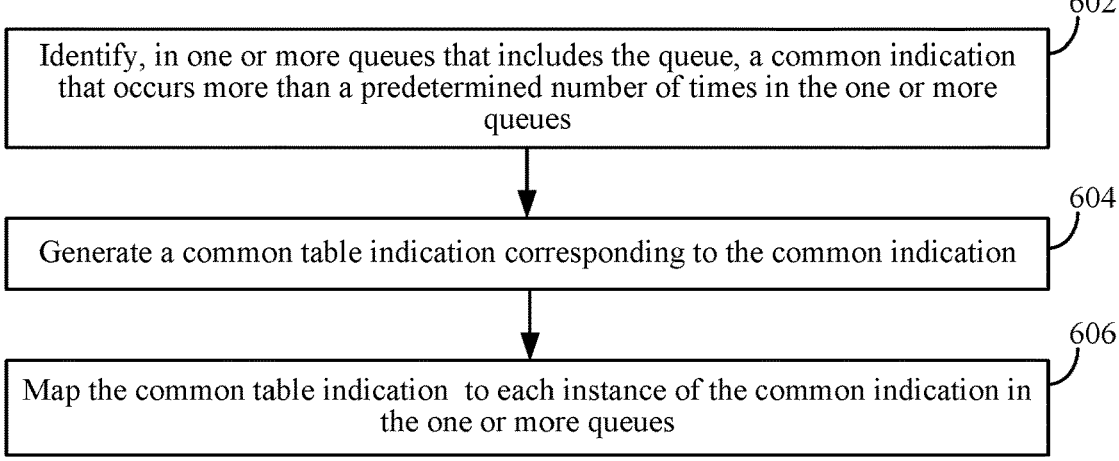
FIG. 6 depicts a flowchart of a process for identifying a common indication included in a queue, in accordance with an embodiment.

As described herein, expression trees may include one or more database expressions. In embodiments, an expression tree may include multiple instances of the same expression. Such expressions may be called "common expressions". A common expression is an expression that occurs more than a predetermined number of times in one or more expression trees. Expression tree generators may be configured to identify common expressions included in one or more expression trees. For example, FIG. 6 depicts a flowchart 600 of a process for identifying a common indication included in a queue, in accordance with an embodiment. In an embodiment, queue manager 204 may operate to perform one or all of the steps of flowchart 600. Flowchart 600 is described as follows with respect to system 100 of FIG. 1 and engine 110 of FIG. 2. Further structural and operational embodiments will be apparent to persons skilled in the relevant art(s) based on the following description. Note that not all steps of flowchart 600 need to be performed in all embodiments.

As described herein, indications included in queues (e.g., expressions of an expression tree) may correspond to data processing operations included in code block statements received by engine 110. In an embodiment, a code block received by engine 110 includes code shown in Example Code Excerpt 1 below:

---
Example Code Excerpt 1

1:      mean = df[id].mean( )
2:      near = df[df[id] > 0.5 * mean) & (df[id] < 1.5 * mean)]

---

Example Code Excerpt 1 is described with continued reference to flowchart 600 of FIG. 6. For Example Code Excerpt 1, df is a dataframe, id is a column of df, and mean and near are variables assigned values as shown above. For example, mean is assigned the mean of the values in id and near is assigned data in the rows of df based on a conditional expression. In Example Code Excerpt 1, rows of df are selected for which values in rows of id are greater than 0.5 multiplied by mean and less than 1.5 multiplied by mean.

In an embodiment, queue manager 204 generates a first expression tree corresponding to mean and a second expression tree corresponding to near. The second expression tree includes two instances of the first expression tree. In this example, if database query generator 212 were to generate a database query corresponding to an execution of the second expression tree, the database query would include a repeated subquery corresponding to the first expression tree. In order to improve performance of a system executing the database query (e.g., system 100 of FIG. 1), queue manager 204 may be configured to perform one or more steps of flowchart 600 in a manner that reduces redundant query execution.

Flowchart 600 begins with step 602. In step 602, a common indication that occurs more than a predetermined number of times in one or more queues is identified. The one or more queues may include the queue described with respect to flowchart 300 of FIG. 3 and optionally any other queue maintained by engine 110, as described herein. For example, queue manager 204 of FIG. 2 may be configured to identify a common expression corresponding to mean in the first and second expression trees ("mean expression" herein) described above with reference to Example Code Excerpt 1. In this case, the mean expression occurs more than a predetermined number of times (e.g., two times) across the first and second expression trees.

In step 604, a common table indication corresponding to the identified common indication is generated. For example, queue manager 204 of FIG. 2 may be configured to generate a common table indication corresponding to the mean expression identified in step 602. The common table indication may be stored in working memory of engine 110, a cache, or a memory device of computing device 108 of FIG. 1.

In step 606, the common table indication is mapped to each instance of the common indication in the one or more queues. For example, queue manager 204 of FIG. 2 may be configured to map each instance of the mean expression in the common table indication generated in step 604 to each instance of the mean expression in the first and second expression trees. Engine 110 may be configured to store a (e.g., global) map that includes the number of times each common indication is used in queues managed by engine 110.

Figure 7:
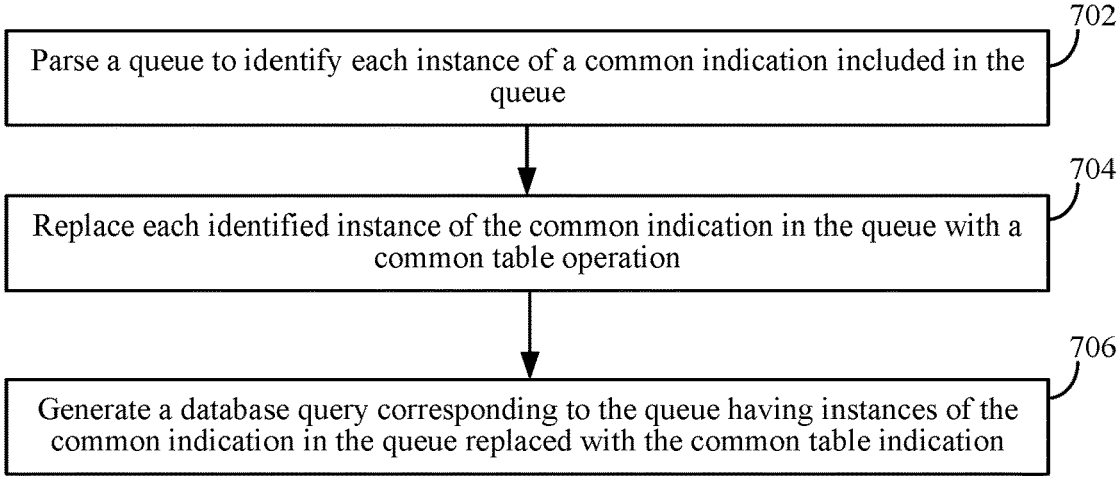
FIG. 7 depicts a flowchart of a process for compiling a translatable portion of a queue into a database query, in accordance with an embodiment.

Data processing operations may be executed in various ways. For instance, as described above with respect to FIGS. 2 and 4, a data processing operation may be executed by compiling a translatable portion of a queue into a database query and causing the database query to be executed by a database engine to generate a query result. The database query may be compiled in various ways. For example, FIG. 7 depicts a flowchart 700 of a process for compiling a translatable portion of a queue into a database query, in accordance with an embodiment. In an embodiment, database query generator 212 may operate to perform one or all of the steps of flowchart 700. Flowchart 700 is described as follows with continued reference to Example Code Excerpt 1 and with respect to system 100 of FIG. 1 and engine 110 of FIG. 2. Further structural and operational embodiments will be apparent to persons skilled in the relevant art(s) based on the following description. Note that not all steps of flowchart 700 need to be performed in all embodiments.

Flowchart 700 begins with step 702. In step 702, a queue is parsed to identify each instance of a common indication included in the queue. For example, database query generator 212 of FIG. 2 may be configured to parse a queue to identify each instance of a common indication included in the queue. Database query generator 212 may identify common indications based on a map of common indications, comparing indications included in a queue, comparing indications included in information 234, and/or by any other method suitable for identifying a common indication, as described herein. For instance, with respect to Example Code Excerpt 1, database query generator 212 may identify two instances of a mean expression in the second expression tree, as described above with respect to FIG. 6 and Example Code Excerpt 1.

In step 704, each identified instance of the common indication in the queue is replaced with a common table indication. For example, database query generator 212 of FIG. 2 may be configured to replace each instance of a common indication in the queue identified in step 702 with the corresponding common table indication generated in step 604 of flowchart 600. For instance, with respect to Example Code Excerpt 1, database query generator 212 may replace the two instances of a mean expression in the second expression tree with a common table indication corresponding to the mean expression (e.g., generated and mapped to the instances of the mean expression, as described with respect to flowchart 600 above).

In step 706, a database query corresponding to the queue having instances of the common indication replaced with the common table indication is generated. The database query may include a clause corresponding to the common table expression. For example, database query generator 212 of FIG. 2 may be configured to generate database query 238 corresponding to the queue having instances of the common indication replaced with the common table indication, as described with respect to step 704 above. For instance, with respect to Example Code Excerpt 1, database query generator 212 may generate database query 238 corresponding to the second expression tree having instances of the mean expression replaced with the common table indication generated and mapped to the second expression tree, as described with respect to flowchart 600 of FIG. 6. In this example, database query 238 may include a WITH clause corresponding to the common table indication. The inclusion of the WITH clause in this manner may increase performance of a system executing database query 238 (e.g., database engine 104 of FIG. 1) compared to an execution of a database query with redundant instances of a subquery corresponding to the mean expression.

Figure 8:
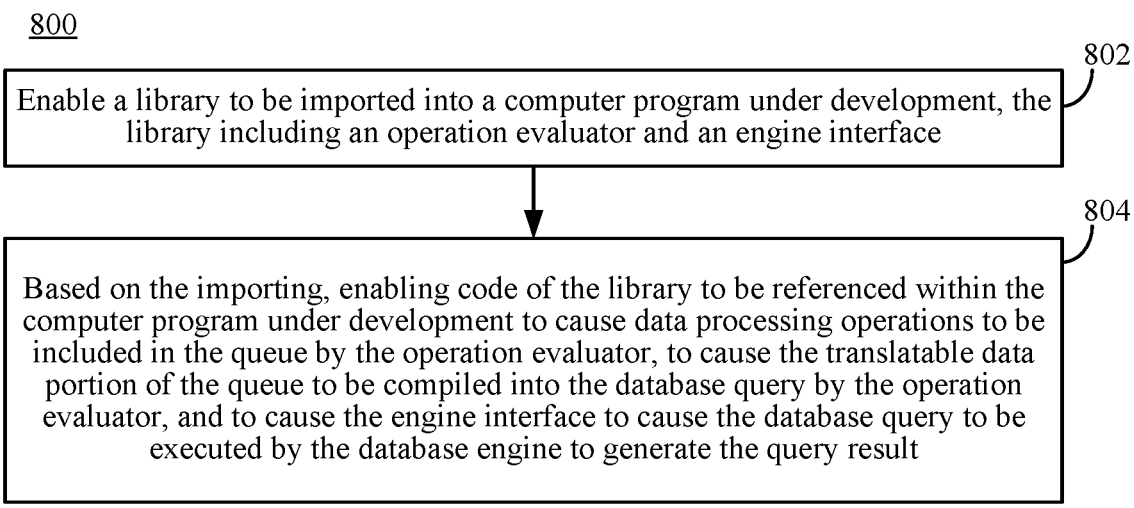
FIG. 8 depicts a flowchart of a process for enabling performance of scalable data processing operations, according to an example embodiment.
Figure 9:
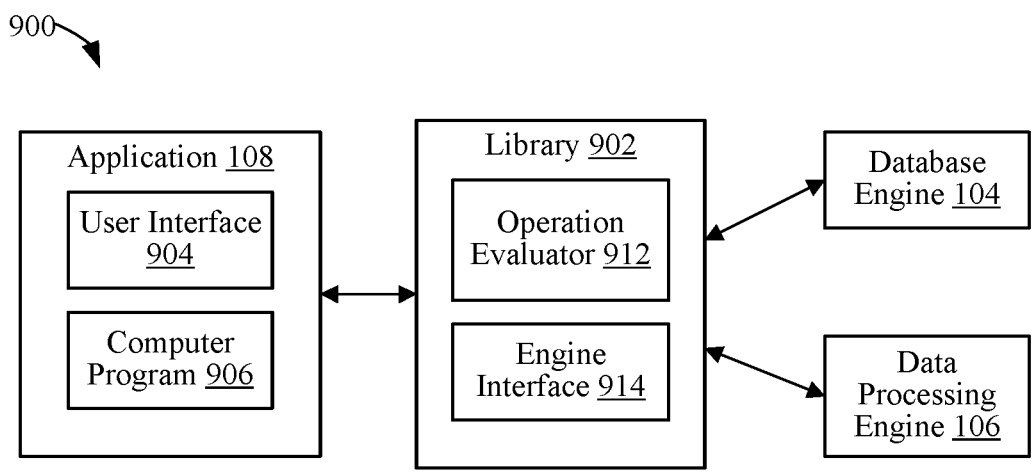
FIG. 9 is a block diagram of a system that may be used to conduct scalable data processing operations, according to an example embodiment.

As described herein, any of the components or subcomponents of engine 110 as described with respect to FIG. 2 may be implemented as logic and/or operations (e.g., code) included in a library (e.g., a Python library) that may be imported into a computer program (e.g., a computer program under development). For example, FIG. 8 depicts a flowchart 800 of a process for enabling scalable data processing operations, according to an example embodiment. In an embodiment, computing device 102 of FIG. 1 or a subcomponent thereof may operate to perform one or all of the steps of flowchart 800. For purposes of illustration, flowchart 800 is described below with respect to FIG. 9. FIG. 9 is a block diagram of a system 900 that may be used to conduct scalable data processing operations, according to an example embodiment. As shown in FIG. 9, system 900 includes application 108, database engine 104, and data processing 106 as described with respect to FIG. 1 above, and library 902. In FIG. 9, application 108 includes a user interface 904 and computer program 906, and library 902 includes an operation evaluator 912 and an engine interface 914. Note that not all steps of flowchart 800 need be performed in all embodiments. Further structural and operational embodiments will be apparent to persons skilled in the relevant art(s) based on the following descriptions of FIGS. 8 and 9.

In the context of FIG. 9, library 902 may provide a programming interface similar to the Pandas library and is suitable for use within notebook experiences and Python scripts by data scientists. As noted above, the users can benefit from the capabilities of the library by leveraging a database engine and data processing engine to perform data processing operations. As shown in FIG. 9, database engine 104 and data processing engine 106 may be external to library 902. Alternatively, library 902 may include some or all of the logic necessary to perform functions of database engine 104 and/or data processing engine 106.

Operation evaluator 912 includes logic and operations for evaluating code blocks inserted into computer program 906. For instance, operation evaluator 912 may include logic and/or operations configured to perform the functions of operation evaluator 112 as described with respect to FIG. 1 above, logic and/or operations configured to perform the functions of operation receiver and examiner 202, queue manager 204, batch generator 206, batch mapper 208, and database query generator 212, as described with respect to FIGS. 2-4 above, and/or any other logic and/or operations for performing one or more steps of flowchart 800 described below. Furthermore, in the context of FIG. 9, engine interface 916 comprises interfaces that enable calls to be made to database engine 106 and/or data processing engine 108 to execute database queries and data processing operations, respectively. Further still, engine interface 116 may include logic and/or operations configured to perform the functions of engine interface 114 as described with respect to FIG. 1 above, logic and/or operations configured to perform the functions of database engine interface 214, data processing engine interface 216, and/or result manager 218 as described above with respect to FIGS. 2 and 4, and/or any other logic and/or operations for performing one or more steps of flowchart 800 described below.

Computer program 906 may comprise, for example, a data science notebook or a script (e.g., a Python script). Computer program 906 may comprise a computer program that is under development (e.g., a data science notebook that a user intends to modify). Alternatively, computer program 906 may comprise an already-developed computer program that is being accessed solely for the purpose of executing it (e.g., a data science notebook that a user wishes only to execute).

Flowchart 800 begins with step 802. In step 802, an application enables a library to be imported into a computer program under development. The library includes an operation evaluator and an engine interface. For example, application 108 of FIG. 9 enables library 902 to be imported into computer program 906. For instance, through interaction with user interface 904, a user (e.g., a data scientist) may insert one or more commands into computer program 906 that, when executed, cause library 902 to be imported into computer program 906. Alternatively, computer program 906 may already include such command(s) at the time computer program 906 is loaded by application 108. In another alternative, application 108 is configured to import library 902 into computer program 906.

In step 804, the importing enables code of the library to be referenced within the computer program under development to cause data processing operations to be included in the queue by the operation evaluator, to cause the translatable data portion of the queue to be compiled into the database query by the operation evaluator, and to cause the engine interface to cause the database query to be executed by the database engine to generate the query result. For example, the importing in step 802 enables code of library 902 of FIG. 9 to be referenced within computer program 906 to perform any of the steps of flowcharts 300, 400, 600, and/or 700, as described above with respect to FIGS. 3, 4, 6, and 7, respectively. For instance, through interaction with user interface 904, a user may reference code of library 902 to perform any of the steps of flowcharts 300, 400, 600, and/or 700. Alternatively, application 108 may be configured to invoke operations of library 902 to perform any of the steps of flowcharts 300, 400, 600 and/or 700.

As described above with respect to FIGS. 8 and 9, a library may be imported into a computer program under development to enable code to be referenced within the computer program under development to generate an expression tree that includes a database expression, generate a database query corresponding to the database expression included in the expression tree, and cause the database query to be executed by a database engine. In an embodiment, a computer program under development may include Example Code Excerpt 2 shown herein below:

Example Code Excerpt 2

```
#   cell 1
1:  import pyfroid.pandas as pd
2:  import seaborn as sns
3:  df = pd.read_csv('nyc-parking-tickets.csv')
#   cell 2
```

Example Code Excerpt 2 -continued

```
4:  df.head(5)
#   cell 3
5:  df['IssueDate'] = pd.to_datetime(df['IssueDate'],
        format = '%m/%d/%Y', errors='coerce')
6:  df['PlateType'] = df['PlateType'].replace({'999': None})
#   cell 4
7:  df.group_by(['PlateType']).count( )['SummonsNumber'].head(10)
#   cell 5
8:  gp = df.loc[:, ['IssueDate', 'SummonsNumber']]
        .groupby('IssueDate').count( )['SummonsNumber]
        .reset_index( )
9:  sns.relplot(x = 'IssueDate', y = 'SummonsNumber',
        data = gp, kind = 'line')
```

Example Code Excerpt 2 includes cells 1-5, each including respective lines of code. Example Code Excerpt 2 may be an embodiment of computer program 906 of FIG. 9 as described above. Alternatively, Example Code Excerpt 2 is code executed by application 108 of FIG. 1. In this context, each cell may represent a code block transmitted to engine 110 by application 108 and each line represents a statement of the code block. Lines within a code block that includes more than one line may be referred to as a "sequence of statements".

Example Code Excerpt 2 may be code included in a notebook (e.g., a Jupyter notebook or a Kaggle notebook) or executed with respect to a notebook. In this context, lines of Example Code Excerpt 2 may be input (e.g., by a user interacting with application 108) into the notebook or executed by application 108 in order to manipulate and/or analyze data of a dataset. The state of the notebook may change as lines or cells of code are input into the notebook and/or executed by application 108. For example, Notebook State Table shown herein below illustrates the state of a notebook with respect to lines of Example Code Excerpt 2.

Notebook State Table

| Example Code Snippet Line # | Notebook State |
|---|---|
| 3 | df: Dex(PROJECT$_{ROW\_NUM,*}$ → CSV) |
| 4 | df: Dex(PROJECT$_{ROW\_NUM,*}$ → CSV) <br> ★ Dex(LIMIT$_5$ → PROJECT$_{ROW\_NUM,*}$ → CSV) |
| 5 | df: Dex(PROJECT$_{ROW\_NUM,*}$ → CSV <br> 'IssueDate':Mex(...)) |
| 6 | df: Dex(PROJECT$_{CASE/WHEN,*}$ → PROJECT$_{ROW\_NUM,*}$ → CSV <br> 'IssueDate':Mex(...)) |
| 7 | df: Dex(PROJECT$_{CASE/WHEN,*}$ → PROJECT$_{ROW\_NUM,*}$ → CSV <br> 'IssueDate':Mex(...)) <br> ★ Dex(LIMIT$_{10}$ → GROUPBY$_{Plate\ Type}$$^{COUNT(SummonsNumber)}$ → PROJECT$_{CASE/WHEN,*}$ → PROJECT$_{ROW\_NUM,*}$ → CSV) |
| 8 | df: Dex(PROJECT$_{CASE/WHEN,*}$ → PROJECT$_{ROW\_NUM,*}$ → CSV <br> 'IssueDate':Mex(...)) <br> ★ Dex(PROJECT$_{SummonsNumber,ROW\_NUM}$ → PROJECT$_{CASE/WHEN,*}$ → PROJECT$_{ROW\_NUM,*}$ → CSV) <br> ★ 'IssueDate':Mex(...) <br> ★ gp: dataframe computed in Pandas |

The first column in Notebook State Table denotes a line of Example Code Excerpt 2 and the second column shows an abridged state of the notebook. CSV, PROJECT, LIMIT, and GROUPBY denote operators of expressions of an expression tree corresponding to the line of Example Code Excerpt 2. "Dex" denotes an expression tree and "Mex" denotes a batch. In Notebook State Table, relationships between expressions are shown by "→". For instance, "OP2→OP1" indicates that an expression of operation "OP2" is a subexpression of the expression of operation "OP1." Furthermore, expressions are labeled with program variables, if any. Further still, expressions marked with "★" denote an expression that is executed (e.g., "materialized") in the corresponding line of Example Code Excerpt 2.

In order to better understand the embodiments described herein, a running example implementation of system 100 of FIG. 1 including engine 110, as described with respect to FIG. 2, will now be described with respect Example Code Excerpt 2, Notebook State Table, and FIGS. 10A-10F. Further structural and operational embodiments will be apparent to persons skilled in the relevant art(s) based on the following description of the running example. While the following running example is described with respect to FIGS. 1 and 2, it is contemplated herein that the running example may be implemented using a library imported into a computer program under development, such as library 902 of system 900 as described with respect to FIG. 9 above.

The running example begins with cell 1 of Example Code Excerpt 2. In line 1 of Example Code Excerpt 2 a pyfroid.pandas library is imported as pd. The pyfroid.pandas library may include operations and logic for interfacing with engine 110. Alternatively, pyfroid.pandas is an embodiment of library 902, as described above with respect to FIG. 9. In line 2, a seaborne library is imported as sns. Line 3 includes code to read comma-separated values (CSV) file titled "nyc-parking-tickets.csv" and generate a dataframe df from the CSV file. When cell 1 is executed, application 108 of FIG. 1 transmits code block 220 to engine 110, as described with respect to FIGS. 2 and 3 above. In this example, code block 220 includes line 3 of Example Code Excerpt 2. Operation receiver and examiner 202 receives code block 220 and examines the code of line 3 to determine if it is translatable to a database query. In this case, the code is translatable to a database query and message 222 including code of line 3 is transmitted to queue manager 204.

Figure 10A:
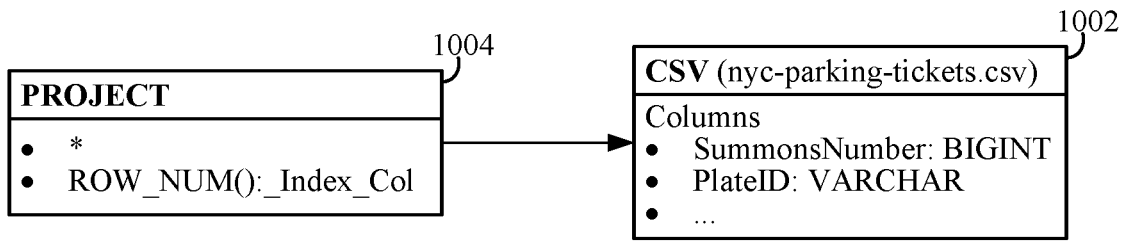
FIG. 10A depicts an example expression tree, in accordance with a running example.

Queue manager 204 of FIG. 2 is configured to generate an expression tree corresponding to the code of line 3, as shown in the corresponding row of Notebook State Table. For example, FIG. 10A depicts an example expression tree 1000A, in accordance with the running example. Queue manager 204 may be configured to generate expression tree 1000A based on the code of line 3.

As shown in FIG. 10A, expression tree 1000A includes a CSV expression 1002 ("expression 1002" herein) and a PROJECT expression 1004 ("expression 1004" herein). Expression 1004 is a subexpression of expression 1002. Expression 1002 includes columns of the CSV file (e.g., "SummonsNumber", "PlateID", etc.) and the type of data included in the corresponding column. Data within columns may be string data (e.g., fixed character strings, variable width character strings (e.g., "VARCHAR" as shown in FIG. 10A), Unicode strings, or binary strings), numeric data (e.g., integers, large value integers (e.g., "BIGINT" as shown in FIG. 10A), precision and scale numbers, monetary data, or floating precision numbers), date data, time data, and/or any other type of data described herein or otherwise known. The CSV file may include additional columns as denoted by the " . . . " shown in expression 1002.

Expression 1004 includes the PROJECT operator that adds a new column "_Index_Col" to df that acts as an index to the dataframe's rows. The PROJECT operator may add additional rows to df, as denoted by the "*" shown in expression 1004. The PROJECT operator includes function "ROW_NUM" to add column_Index_Col. Alternatively, expression 1004 may be an expression that indicates an existing column of the CSV file (e.g., the first column) should be used as an index of df. In a further alternative, df is not index. In this alternative, expression tree 1000A may not include expression 1004.

The running example continues to cell 2 of Example Code Excerpt 2, which includes line 4 of code. Line 4 includes a "head" data processing operation with argument "5". When cell 2 is executed, application 108 of FIG. 1 transmits a command including line 4 of Example Code Excerpt 2 to engine 110, as described elsewhere herein. Operation receiver and examiner 202 receives the command and examines the code of line 4 to determine if it is translatable to a database query. In this case, the code is translatable to a database query and operation receiver and examiner 202 transmits a message including code of line 4 to queue manager 204.

Figure 10B:
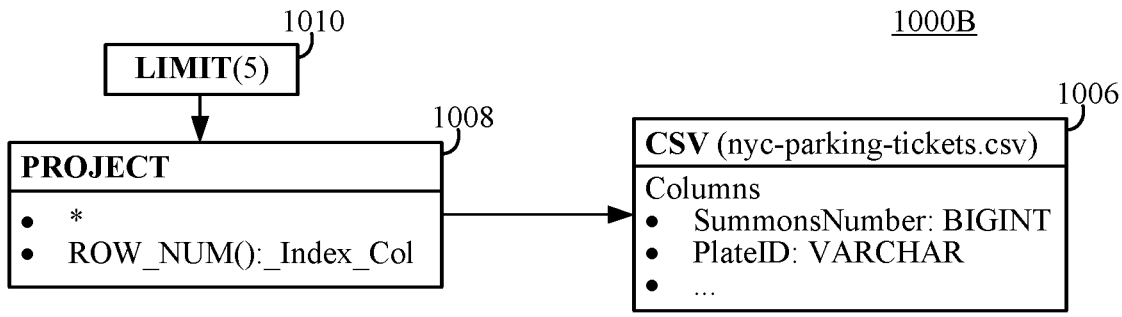
FIG. 10B depicts another example expression tree, in accordance with the running example.

Queue manager 204 of FIG. 2 is configured to generate an expression tree corresponding to the code of line 4, as shown in the corresponding row of Notebook State Table. For example, FIG. 10B depicts an example expression tree 1000B, in accordance with the running example. Queue manager 204 may be configured to generate expression tree 1000B based on the code of line 4 and optionally expression tree 1000A of FIG. 10A. For instance, queue manager 204 may determine that the code of line 4 references df corresponding to expression tree 1000A. In this case, queue manager 204 may copy or otherwise duplicate expression 1002 and expression 1004 of expression tree 1000A to generate corresponding expressions of expression tree 1000B described below. Optionally, queue manager 204 may generate a common expression table corresponding to expression 1002 and/or expression 1004 as described with respect to flowchart 600 of FIG. 6. In an alternative embodiment queue manager 204 updates expression tree 1000A to include expression 1010.

As shown in FIG. 10B, expression tree 1000B includes a CSV expression 1006 ("expression 1006" herein), a PROJECT expression 1008 ("expression 1008" herein), and a LIMIT expression 1010 ("expression 1010" herein). Expression 1006 corresponds to expression 1002 and expression 1008 corresponds to expression 1004, as described above with respect to FIG. 10A. Expression 1010 is a sub-expression of expression 1008. Expression 1010 includes a LIMIT operator that corresponds to "head( )" in line 4 and an operand "5" corresponding to the argument of head( ) "5", in line 4.

As denoted by the "★" in Notebook State Table, line 4, when executed, causes system 100 of FIG. 1 to execute a data processing operation corresponding to expression tree 1000B. For example, operation receiver and examiner 202 of FIG. 2 is configured to determine that the data processing operation corresponding to expression 1010 is undeferrable. Database query generator 212 compiles expressions 1006-1010 to generate database query 238 and causes database query 238 to be executed by database engine 104 to generate query result 244. Query result 244 may be provided to application 108 (e.g., as result dataset 254). For instance, in a computer program development implementation, query result may be displayed in a user interface of application 108.

The running example continues to cell 3 of Example Code Excerpt 2, which includes lines 5 and 6 of code. Line 5 includes a data processing operation that selects the "IssueDate" column of df and assigns new values to IssueDate based on a to_datetime function. When line 5 is executed, application 108 of FIG. 1 transmits a command including line 5 of Example Code Excerpt 2 to engine 110, as described elsewhere herein. Operation receiver and examiner 202 receives the command and examines the code of line 5 to determine if it is translatable to a database query. In this case, operation receiver and examiner 202 determines that the argument "errors=coerce" in line 5 is not translatable to a database query and transmits message 224 including code of line 5 to batch generator 206.

Batch generator 206 of FIG. 2 is configured to generate a batch corresponding to line 5 of Example Code Excerpt 2. For example, batch generator 206 examines line 5, identifies function "pd.to_datetime", positional argument "df['IssueDate']", and keyword arguments "format='% m/% d/% Y'" and "errors='coerce'", and generates batch 226. Batch 226 may be a batch triplet "(pd.to_datetime, df['IssueDate'], {'format': '% m/% d/% Y', 'errors': 'coerce' })".

Figure 10C:
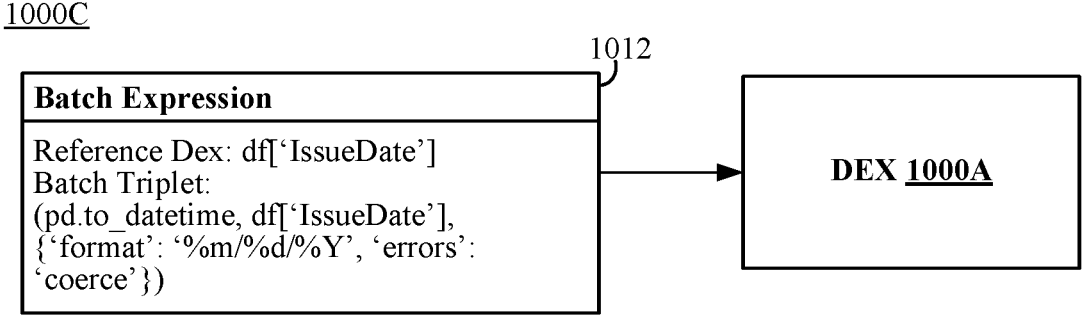
FIG. 10C depicts an example mixed expression tree, in accordance with the running example.

Batch mapper 208 of FIG. 2 is configured to map batch 226 to an expression tree to generate a mixed expression tree corresponding to the code of line 5, as shown in the corresponding row of Notebook State Table. For example, FIG. 10C depicts an example mixed expression tree 1000C, in accordance with the running example. Batch mapper 208 may be configured to generate mixed expression tree 1000C by mapping batch 226 to expression tree 1000A of FIG. 10A.

As shown in FIG. 10C, mixed expression tree 1000C includes batch expression 1012 ("expression 1012" herein) and expression tree 1000A (labeled "DEX 1000A"). Expression 1012 is mapped to DEX 1000A. Expression 1012 includes the expression tree that the batch is mapped to (e.g., the "IssueDate" column of df) and the batch triplet.

The running example continues to line 6 of Example Code Excerpt 2. Line 6 includes a data processing operation that selects the "PlateType" column of df and assigns new values to PlateType based on a replace function. When line 6 is executed, application 108 of FIG. 1 transmits a command including line 6 of Example Code Excerpt 2 to engine 110, as described elsewhere herein. Alternatively, lines 5 and 6 may be executed and transmitted as cell 2. Operation receiver and examiner 202 receives the command and examines the code of line 6 to determine if it is translatable to a database query. In this case, the code is translatable to a database query and operation receiver and examiner 202 transmits a message including line 6 to queue manager 204.

Figure 10D:
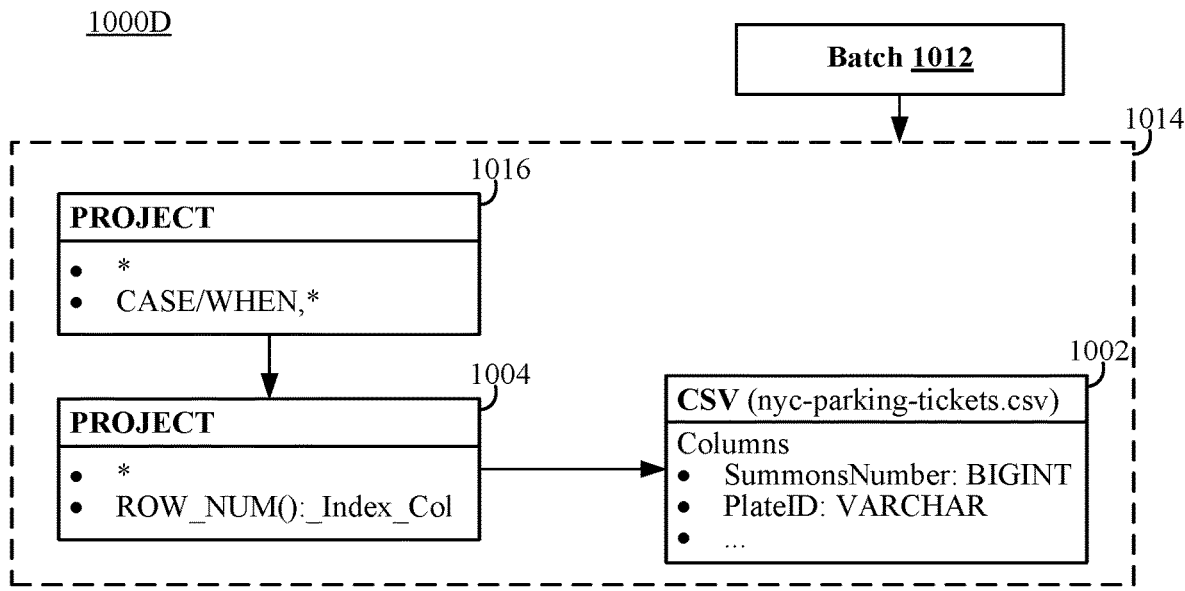
FIG. 10D depicts an updated version of the mixed expression tree of FIG. 10C, in accordance with the running example embodiment.

Queue manager 204 is configured to update mixed expression tree 1000C corresponding to the code of line 6, as shown in the corresponding row of Notebook State Table. For example, FIG. 10D depicts an updated version of mixed expression tree 1000C of FIG. 10C ("mixed expression tree 1000D" herein), in accordance with the running example embodiment. Queue manager 204 may be configured to generate mixed expression tree 1000D based on the code of line 6 and mixed expression tree 1000C.

As shown in FIG. 10D, mixed expression tree 1000D includes expression 1012, as described with respect to FIG. 10C, and declarative portion 1014 ("DEX 1014" herein). DEX 1014 includes expressions 1002 and 1004, as described above with respect to FIG. 10A, and a PROJECT expression 1016 ("expression 1016" herein). Project expression 1016 includes the PROJECT operator that replaces values in the PlateType column of df according to the argument "CASE/WHEN". For instance, the argument "CASE/WHEN" may translate to "CASE PlateType WHEN '999' THEN NULL ELSE PlateType". The PROJECT operator may include additional arguments, as denoted by the "*" shown in expression 1016.

The running example continues to cell 4 of Example Code Excerpt 2, which includes line 7 of code. Line 7 includes a data processing operation that groups df by the PlateType column and counts the values in the SummonsNumber column for the first 10 rows of df. When cell 4 is executed, application 108 of FIG. 1 transmits a command including line 7 of Example Code Excerpt 2 to engine 110, as described elsewhere herein. Operation receiver and examiner 202 receives the command and examines the code of line 7 to determine if it is translatable to a database query. In this case, the code is translatable to a database query and operation receiver and examiner 202 transmits a message including code of line 7 to queue manager 204.

Figure 10E:
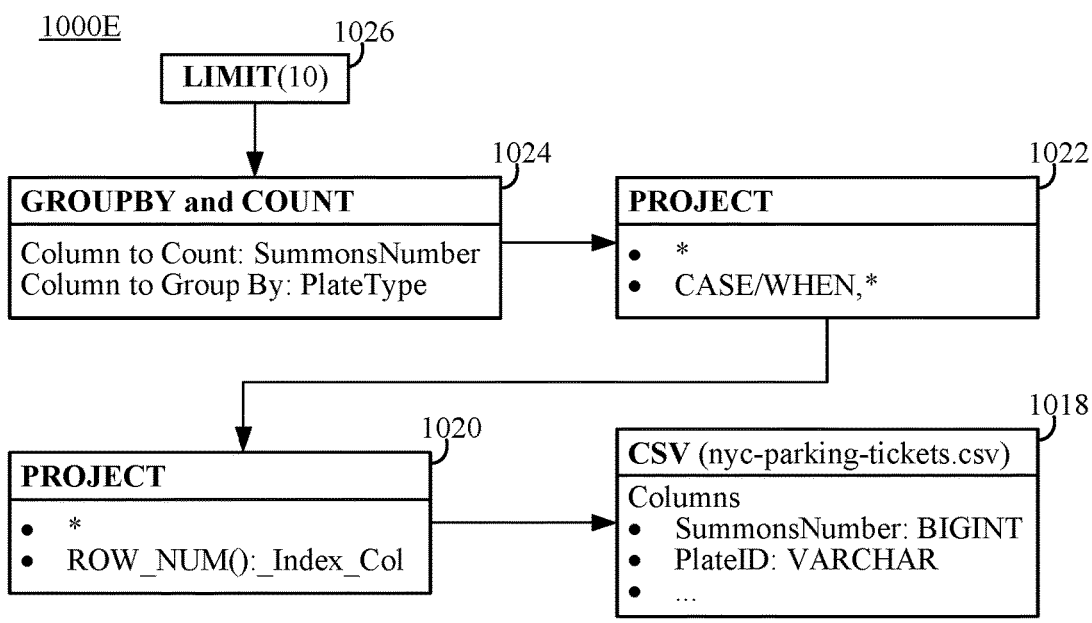
FIG. 10E depicts another example expression tree, in accordance with the running example.

Queue manager 204 of FIG. 2 is configured to generate an expression tree corresponding to the code of line 7, as shown in the corresponding row of Notebook State Table. For example, FIG. 10E depicts another example expression tree 1000E, in accordance with the running example. Queue manager 204 may be configured to generate expression tree 1000E based on the code of line 7 and optionally mixed expression tree 1000D of FIG. 10D, in a manner similar to that described above with respect to FIG. 10B.

As shown in FIG. 10E, expression tree 1000E includes a CSV expression 1018 ("expression 1018" herein), a PROJECT expression 1020 ("expression 1020" herein), a PROJECT expression 1022 ("expression 1022" herein), GROUPBY and COUNT expression 1024 ("expression 1024" herein), and LIMIT expression 1026 ("expression 1026" herein). Expressions 1018, 1020, and 1022 correspond to expressions 1002, 1004, and 1016 of FIG. 10D, respectively.

Expression 1024 is a sub-expression of expression 1022 and includes GROUPBY and COUNT operators corresponding to ".groupby( )" and ".count( )" functions in line 7. Expression 1024 includes the "Column to Count" argument of the COUNT operator (the "SummonsNumber" column of df) and the "Column to Group By" argument of the GROUPBY operator (the "PlateType" column of df). Expression 1024 may include additional arguments, not shown in FIG. 10E.

Expression 1026 is a sub-expression of expression 1024 and includes a LIMIT operator that corresponds to "head( )" in line 7 and an operand "10" corresponding to the argument of head( ) "10", in line 7.

As denoted by the "★" in Notebook State Table, line 7, when executed, causes system 100 of FIG. 1 to execute a data processing operation corresponding to expression tree 1000E. For example, operation receiver and examiner 202 of FIG. 2 is configured to determine that the data processing operation corresponding to expression 1026 is undeferrable. Database query generator 212 compiles expressions 1018-1026 to generate a database query and causes the database query to be executed by database engine 104 to generate a query result. The query result may be provided to application 108, as described elsewhere herein.

The running example continues to cell 5 of Example Code Excerpt 2, which includes lines 8 and 9. Line 8 includes a generation of a dataframe gp by selecting, grouping, and counting data in df. When line 8 is executed, application 108 of FIG. 1 transmits a command including line 8 of Example Code Excerpt 2 to engine 110, as described elsewhere herein. Operation receiver and examiner 202 receives the command and examines the code of line 8 to determine if it is translatable to a database query. In this case, operation receiver and examiner 202 determines that at least a portion of line 8 is not translatable to a database query, since the ".groupby" function includes the IssueDate column as an argument thereof. Furthermore, operation receiver and examiner 202 determines that the data processing operations of line 8 are undeferrable, as denoted by the "★" in Notebook State Table. In any case operation receiver and examiner 202 provides a translatable portion of line 8 to queue manager 204 and provides information to queue manager 204 and/or database query generator 212 including: line 8, an indication that at least a portion of line 8 is not translatable to a database query, and an indication that line 8 requires an execution of a database query.

Figure 10F:
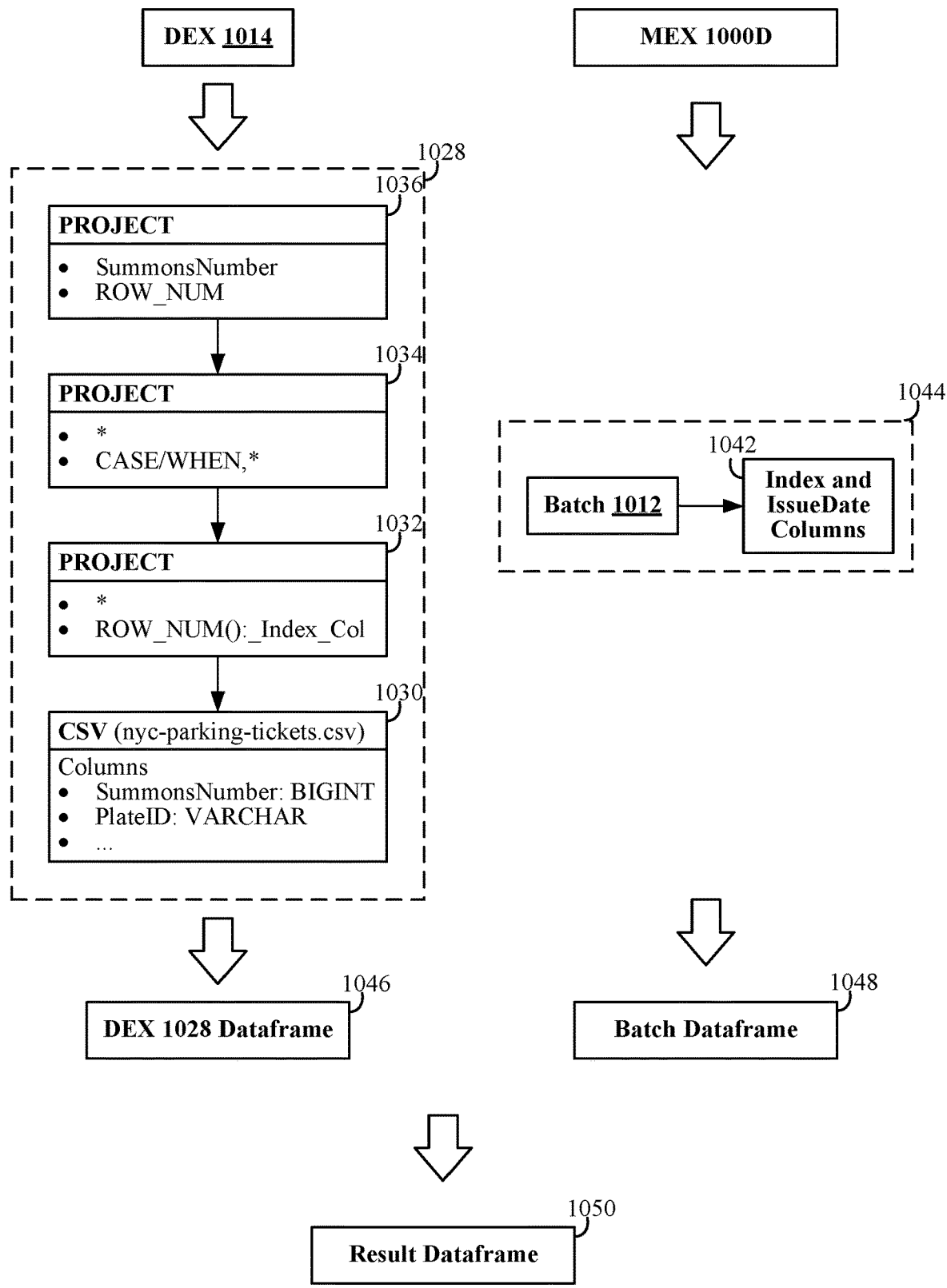
FIG. 10F depicts an example data processing execution based on the mixed expression tree of FIG. 10D, in accordance with the running example.

Code of line 8 may be processed by system 100 of FIG. 1 in various ways. For example, FIG. 10F depicts an example data processing execution 1000F ("execution 1000F" herein) based on mixed expression tree 1000D of FIG. 10D, in accordance with the running example. Engine 110, as described with respect to FIGS. 1 and 2, may be configured to perform execution 1000F. As shown in FIG. 10F, execution 1000F includes DEX 1014, as described above with respect to FIG. 10D, mixed expression tree 1000D of FIG. 10D (labeled "MEX 1000D"), an expression tree 1028, information 1044, a first query result 1046 (labeled "DEX 1028 Dataframe"), a batch result 1048, and a result dataframe 1050. Execution 1000F is described as follows with continued reference to FIG. 2, Example Code Excerpt 2, and Notebook State Table.

Queue manager 204 of FIG. 2 is configured to generate expression tree 1028 corresponding to the ".count( )" function in line 8 and optionally DEX 1014 of FIG. 10D, in manner similar to that described above with respect to FIG. 10B. As shown in FIG. 10F, expression tree 1028 includes a CSV expression 1030 ("expression 1030" herein), a PROJECT expression 1032 ("expression 1032" herein), a PROJECT expression 1034 ("expression 1034" herein), and a PROJECT expression 1036 ("expression 1036" herein). Expressions 1030, 1032, and 1034 correspond to expressions 1002, 1004, and 1016 of FIG. 10D, respectively. Expression 1036 is a sub-expression of expression 1034 that includes a PROJECT operator that corresponds to "groupby( )" in line 8 and an operands "SummonsNumber" (indicating the column to be counted) and "ROW_NUM" (indicating what to count within column SummonsNumber).

Database query generator 212 of FIG. 2 is configured to compile expressions 1030-1036 to generate a database query and causes the database query to be executed by database engine 104 to generate query result 1046. As shown in FIG. 9, query result 1046 is a dataframe corresponding to expression tree 1028.

As shown in FIG. 10F, information 1044 includes batch 1012 and dataframe columns 1042. Dataframe columns 1042 may include all or a subset of columns of query result 1046. For example, as shown in FIG. 10F, dataframe columns 1042 includes the index column and the IssueDate column of query result 1046. By selecting a subset of columns, systems described herein enable data processing engine 106 to execute batches against larger datasets, execute a batch faster, and/or utilize fewer computing resources to execute the batch. Data processing engine interface 216 of FIG. 2 is configured to cause information 1044 to be provided to data processing engine 106 of FIG. 1 to generate batch result 1048 (e.g., by executing batch 1012 with respect to dataframe columns 1042).

Result dataset 1050 is generated based on query result 1046 and batch result 1048. For instance, result manager 218 of FIG. 2 may merge query result 1046 and batch result 1048 using the index column. Alternatively, data processing engine interface 216 may cause query result 1046 and batch result 1048 to be merged by data processing engine 106 of FIG. 1. As shown in line 8 of Example Code Excerpt 2, result dataset 1050 is a dataframe assigned to the variable gp.

The running example continues to line 9 of Example Code Excerpt 2. Line 9 includes a data processing operation that plots the IssueDate and SummonsNumber columns of gp. Operation receiver and examiner 202 is configured to receive a code block statement corresponding to line 9 and determine if it is translatable to a database query. In this case, the code is not translatable to a database query and does not relate to an existing expression tree; therefore, the code is provided to data processing engine 106 for execution thereof. Alternatively, the code block statement corresponding to line 9 may bypass operation receiver and examiner 202 (e.g., application 108 may transmit the code block statement to data processing engine 106). In this context, system 100 is configured to automatically handle data processing operation execution and materialization.

III. Further Example Embodiments and Advantages

As noted above, systems and devices may be configured in various ways for performing scalable data processing operations. In one aspect, example embodiments have been described with respect to libraries that access data processing engines and database engines to enable scalable data processing operations; however, it is also contemplated herein that a library may include data processing and database query processing logic. For example, a library may be a "content pack" that includes the library, data processing logic, and database query processing logic.

Queue managers described herein may update an existing queue to include an indication of a data processing operation in various ways. For instance, a queue manager may access an existing queue maintained in working memory of the queue manager or a code block processing engine, access an expression tree, query results, and/or data processing results stored in a cache of a code block processing engine or related application or stored in a memory device of a computing device, and/or otherwise access the existing queue for updating thereof.

Embodiments described herein have been described with respect to performing scalable data processing operations in a manner that enables manipulating larger datasets, improves performance of a computing device executing an application to perform data processing operations, maintains functionality with respect to small datasets, and/or reduces resources used in performing a data processing operation. For instance, a computing device executing an application that causes a data processing operation to be performed may analyze a dataset larger than the size of RAM of the computing device.

Systems described herein may be configured to reduce the number of or size of database queries executed in various ways. For example, a system described herein may store query results generated by a database engine and/or data processing results generated by a data processing engine in a cache. In another aspect, a system described herein may be configured to order batches in a manner that reduces resources used to execute data processing operations.

Moreover, example implementations have been described herein with respect to a SQL database engine and a Pandas data processing engine; however, other database engines and/or data processing engines may be used. Furthermore, a system described herein may be configured to interface with more than one database engine or more than one data processing engine. Moreover, database queries may be direct queries or user-defined functions.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Computer System Implementation

System 100, computing device 102, database engine 104, data processing engine 106, application 108, engine 110, operation evaluator 112, engine interface 114, operation receiver and examiner 202, queue manager 204, batch generator 206, batch mapper 208, database query generator 212, database engine interface 214, data processing engine interface 216, result manager 218, flowchart 300, flowchart 400, mixed expression tree 500, flowchart 600, flowchart 700, flowchart 800, system 900, library 902, user interface 904, computer program 906, operation evaluator 912, engine interface 914, expression tree 1000A, expression tree 1000B, mixed expression tree 1000C, mixed expression tree 1000D, expression tree 1000E, DEX 1014, expression tree 1028, information 1044, query result 1046, batch result 1048, and/or result dataset 1050 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
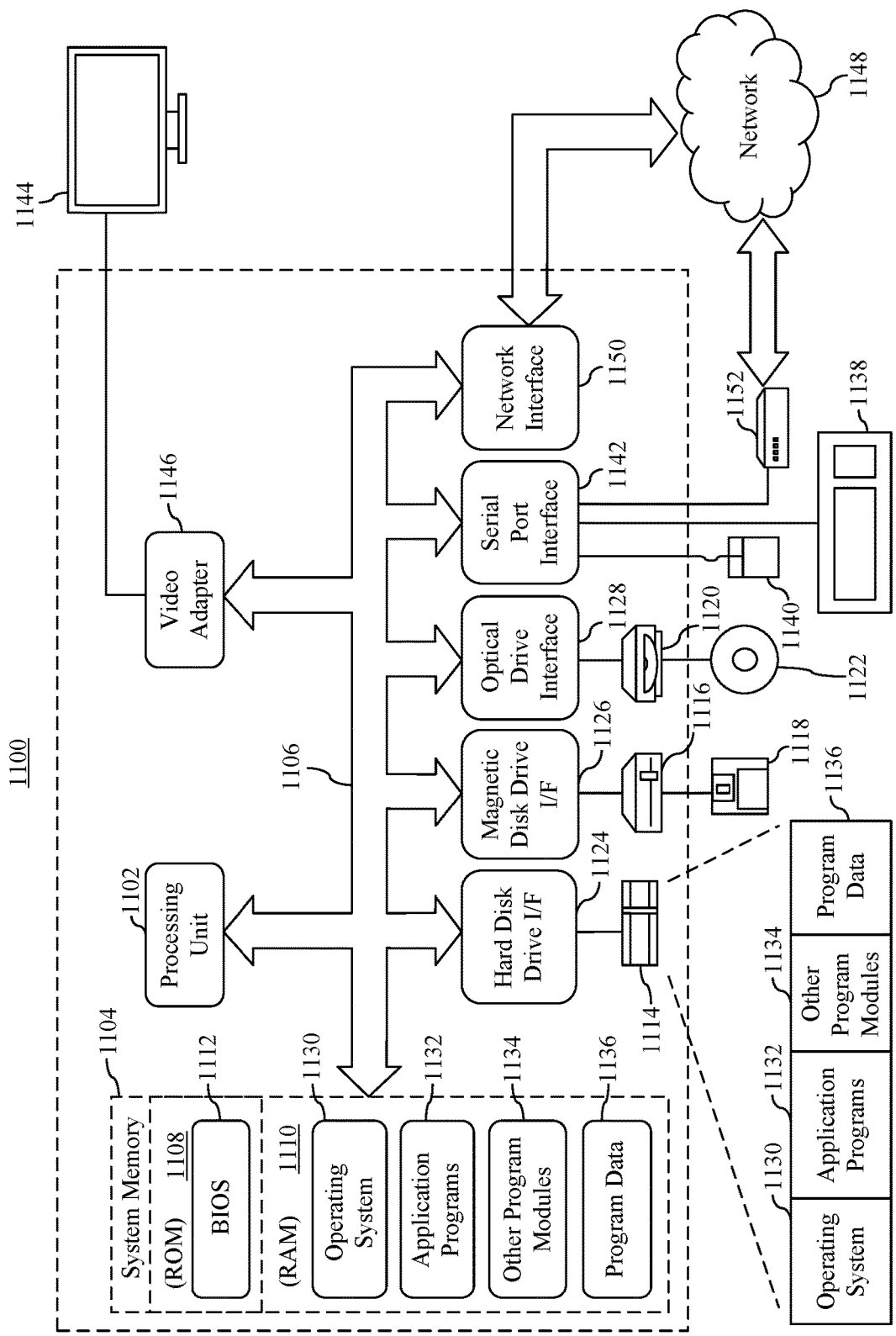
FIG. 11 is a block diagram of an example computing device that may be used to implement embodiments.

FIG. 11 depicts an exemplary implementation of a computer system 1100 ("system 1100" herein) in which embodiments may be implemented. For example, system 1100 may be used to implement system 100, computing device 102, database engine 104, data processing engine 106, application 108, engine 110, operation evaluator 112, and/or engine interface 114, as described above in reference to FIG. 1. System 1100 may also be used to implement operation receiver and examiner 202, queue manager 204, batch generator 206, batch mapper 208, database query generator 212, database engine interface 214, data processing engine interface 216, and/or result manager 218, as described above in reference to FIG. 2. System 1100 may also be used to implement library 902, user interface 904, computer program 906, operation evaluator 912, and/or engine interface 914, as described above in reference to FIG. 9. System 1100 may also be used to implement any of the steps of any of the flowcharts of FIGS. 3, 4, and/or 6-8, as described above. System 1100 may also be used to implement any receptions, determinations, generations, updates, mappings, causations, identifications, parsings, replacements, transmissions, storage, executions, and/or the like associated with the embodiments of FIGS. 5 and/or 10A-10F. The description of system 1100 provided herein is provided for purposes of illustration and is not intended to be limiting. Embodiments may be implemented in further types of computer systems, as would be known to persons skilled in the relevant art(s).

As shown in FIG. 11, system 1100 includes one or more processors, referred to as processing unit 1102, a system memory 1104, and a bus 1106 that couples various system components including system memory 1104 to processing unit 1102. Processing unit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 1102 may execute program code stored in a computer readable medium, such as program code of operating system 1130, application programs 1132, other program modules 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all the functions and features of database engine 104, data processing engine 106, application 108, engine 110, operation evaluator 112, engine interface 114, operation receiver and examiner 202, queue manager 204, batch generator 206, batch mapper 208, database query generator 212, database engine interface 214, data processing engine interface 216, result manager 218, flowchart 300, flowchart 400, flowchart 600, flowchart 700, flowchart 800, library 902, user interface 904, computer program 906, operation evaluator 912, and/or engine interface 914 (including any steps of flowcharts 300, 400, and/or 600-800).

A user may enter commands and information into the system 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in, system 1100. Display screen 1144 may display information, as well as being a user interface for receiving user commands and/or other information (e.g., by touch, finger gestures, virtual keyboard, etc.). For example, display screen 1144 may implement an interface (e.g., user interface 904 of FIG. 9). The interface may be configured to display query result 244, first data processing result 250, and/or result dataset 254, as described with respect to FIG. 2, computer program 906, as described with respect to FIG. 9, query result 1046, batch result 1048, result dataset 1050, and/or other information associated with scalable data processing operations. In addition to display screen 1144, system 1100 may include other peripheral output devices (not shown) such as speakers and printers.

System 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other program modules 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable system 1100 to implement features of embodiments described herein. Accordingly, such computer programs represent controllers of the system 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1102 to perform any or all of the functions and features of database engine 104, data processing engine 106, application 108, engine 110, operation evaluator 112, and/or engine interface 114 as described above in reference to FIG. 1, operation receiver and examiner 202, queue manager 204, batch generator 206, batch mapper 208, database query generator 212, database engine interface 214, data processing engine interface 216, and/or result manager 218 as described above in reference to FIG. 2, and/or library 902, user interface 904, computer program 906, operation evaluator 912, and/or engine interface 914 as described above in reference to FIG. 9. The program modules may also include computer program logic that, when executed by processing unit 1102, causes processing unit 1102 to perform any of the steps of any of the flowcharts of FIGS. 3, 4, and/or 6-8, as described above. The program modules may also include computer logic that, when executed by processing unit 1102, causes processing unit 1102 to perform any of the various receptions, determinations, generations, updates, mappings, causations, identifications, parsings, replacements, transmissions, storage, executions, and/or the like associated with the embodiments of FIGS. 5 and/or 10A-10F.

V. Additional Exemplary Embodiments

In an embodiment, a system comprises one or more processors and memory that stores program code executable by the one or more processors. The program code comprises a code block processing engine configured to process a sequence of statements of a code block. The statements including data processing operations. The code block processing engine includes an operation evaluator and an engine interface. The operation evaluator is configured to maintain a queue that includes a translatable portion comprising indications of data processing operations translatable to database queries and a non-translatable portion comprising indications of non-translatable data processing operations. The operation evaluator is further configured to determine that a first data processing operation of a first code block statement is translatable to a database query. The operation evaluator is further configured to include an indication of the first data processing operation in the translatable portion of the queue. The operation evaluator is further configured to, responsive to a determination that a second data processing operation of a second code block statement is undeferrable, compile the translatable portion of the queue into a database query. The engine interface is configured to cause the database query to be executed by a database engine to generate a query result and transmit a result dataset corresponding to the query result to an application configured to analyze the result dataset.

In an embodiment, the operation evaluator is further configured to determine that a third data processing operation of a third code block statement is translatable to a database query. The third code block statement is subsequent to the first code block statement and preceding the second code block statement. The third data processing operation is dependent on an execution of the first data processing operation. The operation evaluator is further configured to include an indication of the third data processing operation in the translatable portion of the queue. The indication indicates that the third data processing operation is dependent on the execution of the first data processing operation.

In an embodiment, the operation evaluator is further configured to determine that a third data processing operation of a third code block statement is not translatable to a database query. The third code block statement is subsequent to the first code block statement and preceding the second code block statement. The operation evaluator is further configured to include an indication of the third data processing operation in the non-translatable portion of the queue.

In an embodiment, the operation evaluator is configured to determine that the third data processing operation is not translatable to a database query based on at least one of: a function of the third data processing operation not being translatable to an operator of a database query; or an argument of the third data processing operation not being translatable to an operand of a database query.

In an embodiment, the engine interface is further configured to cause the third data processing operation to be executed by a data processing engine to generate a first data processing result, and generate the result dataset based on the query result and the first data processing result.

In an embodiment, the operation evaluator is further configured to determine that a fourth data processing operation of a fourth code block statement is not translatable to a database query. The fourth code block statement is subsequent to the third code block statement and preceding the second code block statement. The fourth data processing operation is dependent on an execution of the third data processing operation. The operation evaluator is further configured to include an indication of the fourth data processing operation in the non-translatable portion of the queue. The indication indicates that the third data processing operation is dependent on the execution of the third data processing operation. The engine interface is further configured to cause the fourth data processing operation to be executed by the data processing engine to generate a second data processing result, and update the result dataset based on the second data processing result.

In an embodiment, the operation evaluator is further configured to identify, in one or more queues that includes the queue, a common indication that occurs more than a predetermined number of times. The indication of the first data processing operation is a first instance of the common indication. The operation evaluator is further configured to generate a common table indication corresponding to the common indication, and map the common table indication to each instance of the common indication in the one or more queues.

In an embodiment, to compile the translatable portion of the queue into a database query, the operation evaluator is configured to parse the queue to identify each instance of the common indication included in the queue. The operation evaluator is further configured to replace each identified instance of the common indication in the queue with the common table indication. The operation evaluator is further configured to generate the database query corresponding to the queue having the instances of the common indication in the queue replaced with the common table indication.

In an embodiment, the program code further comprises a library that includes the code block processing engine, and an application configured to import the library into a computer program.

In an embodiment, a method for processing a sequence of statements of a code block is performed. The statements include data processing operations. The method includes maintaining a queue that includes a translatable portion comprising indications of data processing operations translatable to data queries and a non-translatable portion comprising indications of non-translatable data processing operations. A determination that a first data processing operation of a first code block statement is translatable to a database query is made. An indication of the first data processing operation is included in the translatable portion of the queue. Responsive to a determination that a second data processing operation of a second code block statement is undeferrable, the translatable portion of the queue is compiled into a database query. The execution of the database query by a database engine to generate a query result is caused. A result dataset corresponding to the query result is transmitted to an application configured to analyze the result dataset.

In an embodiment, a determination that a third data processing operation of a third code block statement is translatable to a database query is made. The third code block statement subsequent to the first code block statement and preceding the second code block statement. The third data processing operation is dependent on an execution of the first data processing operation. An indication of the third data processing operation is included in the translatable portion of the queue. The indication indicates that the third data processing operation is dependent on the execution of the first data processing operation.

In an embodiment, a determination that a third data processing operation of a third code block statement is not translatable to a database query is made. The third code block statement subsequent to the first code block statement and preceding the second code block statement. An indication of the third data processing operation is included in the non-translatable portion of the queue.

In an embodiment, determining that the third data processing operation is not translatable to a database query is based on at least one of: a function of the third data processing operation not being translatable to an operator of a database query; or an argument of the third data processing operation not being translatable to an operand of a database query.

In an embodiment, the execution of the third data processing operation by a data processing engine to generate a first data processing result is caused. The result dataset is generated based on the query result and the first data processing result.

In an embodiment, a determination that a fourth data processing operation of a fourth code block statement is not translatable to a database query is made. The fourth code block statement subsequent to the third code block statement and preceding the second code block statement. The fourth data processing operation is dependent on an execution of the third data processing operation. An indication of the fourth data processing operation is included in the non-translatable portion of the queue. The indication indicates that the third data processing operation is dependent on the execution of the third data processing operation. The execution of the fourth data processing operation by the data processing engine to generate a second data processing result is caused. The result dataset is updated based on the second data processing result.

In an embodiment, a common indication that occurs more than a predetermined number of times is identified in one or more queues that includes the queue. The indication of the first data processing operation is a first instance of the common indication. A common table indication corresponding to the common indication is generated. The common table indication is mapped to each instance of the common indication in the one or more queues.

In an embodiment, compiling the portion of the queue into a database query comprises: parsing the queue to identify each instance of the common indication included in the queue; replacing each identified instance of the common indication in the queue with the common table indication; and generating the database query corresponding to the queue having the instances of the common indication in the queue replaced with the common table indication.

In an embodiment, a library is enabled to be imported into a computer program under development. The library including an operation evaluator and an engine interface. Based on the importing, code of the library is enabled to be referenced within the computer program under development to cause data processing operations to be included in the queue by the operation evaluator, to cause the translatable data portion of the queue to be compiled into the database query by the operation evaluator, and to cause the engine interface to cause the database query to be executed by the database engine to generate the query result.

In an embodiment, a computer-readable storage medium has programming instructions encoded thereon that are executable by one or more processors to perform a method for processing a sequence of statements of a code block. The statements include data processing operations. The method comprises maintaining a queue that includes a translatable portion comprising indications of data processing operations translatable to data queries and a non-translatable portion comprising indications of non-translatable data processing operations. A determination that a first data processing operation of a first code block statement is translatable to a database query is made. An indication of the first data processing operation is included in the translatable portion of the queue. Responsive to a determination that a second data processing operation of a second code block statement is undeferrable, the translatable portion of the queue is compiled into a database query. The execution of the database query by a database engine to generate a query result is caused. A result dataset corresponding to the query result is transmitted to an application configured to analyze the result dataset.

In an embodiment, the method further includes determining that a third data processing operation of a third code block statement is not translatable to a database query. The third code block statement subsequent to the first code block statement and preceding the second code block statement. An indication of the third data processing operation is included in the non-translatable portion of the queue. The execution of the third data processing operation by a data processing engine to generate a first data processing result is caused. The result dataset is generated based on the query result and the first data processing result.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
one or more processors; and
memory that stores program code executable by the one or more processors, the program code comprising:
   a code block processing engine configured to process a sequence of statements of a code block, the statements including data processing operations, the code block processing engine including
      an operation evaluator configured to:
         maintain a queue that includes a translatable portion comprising indications of data processing operations translatable to database queries and a non-translatable portion comprising indications of non-translatable data processing operations,
         determine that a first data processing operation of a first code block statement is translatable to a database query,
         include an indication of the first data processing operation in the translatable portion of the queue, and
         responsive to a determination that a second data processing operation of a second code block statement is undeferrable,
      compile the translatable portion of the queue into a database query; and
      an engine interface configured to:
         cause the database query to be executed by a database engine to generate a query result; and
         transmit a result dataset corresponding to the query result to an application configured to analyze the result dataset.

2. The system of claim 1, wherein the operation evaluator is further configured to:
determine that a third data processing operation of a third code block statement is translatable to a database query, the third code block statement subsequent to the first code block statement and preceding the second code block statement, the third data processing operation dependent on an execution of the first data processing operation; and
include an indication of the third data processing operation in the translatable portion of the queue, the indication indicating that the third data processing operation is dependent on the execution of the first data processing operation.

3. The system of claim 1, wherein the operation evaluator is further configured to:
determine that a third data processing operation of a third code block statement is not translatable to a database query, the third code block statement subsequent to the first code block statement and preceding the second code block statement; and
include an indication of the third data processing operation in the non-translatable portion of the queue.

4. The system of claim 3, wherein the operation evaluator is configured to determine that the third data processing operation is not translatable to a database query based on at least one of:

a function of the third data processing operation not being translatable to an operator of a database query; or an argument of the third data processing operation not being translatable to an operand of a database query.

5. The system of claim 3, wherein the engine interface is further configured to:

cause the third data processing operation to be executed by a data processing engine to generate a first data processing result; and generate the result dataset based on the query result and the first data processing result.

6. The system of claim 5, wherein:

the operation evaluator is further configured to:

determine that a fourth data processing operation of a fourth code block statement is not translatable to a database query, the fourth code block statement subsequent to the third code block statement and preceding the second code block statement, the fourth data processing operation dependent on an execution of the third data processing operation, and include an indication of the fourth data processing operation in the non-translatable portion of the queue, the indication indicating that the third data processing operation is dependent on the execution of the third data processing operation; and the engine interface is further configured to:

cause the fourth data processing operation to be executed by the data processing engine to generate a second data processing result, and update the result dataset based on the second data processing result.

7. The system of claim 1, wherein the operation evaluator is further configured to:

identify, in one or more queues that includes the queue, a common indication that occurs more than a predetermined number of times, wherein the indication of the first data processing operation is a first instance of the common indication;

generate a common table indication corresponding to the common indication; and map the common table indication to each instance of the common indication in the one or more queues.

8. The system of claim 7, wherein to compile the translatable portion of the queue into a database query, the operation evaluator is configured to:

parse the queue to identify each instance of the common indication included in the queue;

replace each identified instance of the common indication in the queue with the common table indication; and generate the database query corresponding to the queue having the instances of the common indication in the queue replaced with the common table indication.

9. The system of claim 1, wherein the program code further comprises:

a library that includes the code block processing engine; and an application configured to import the library into a computer program.

10. A method for processing a sequence of statements of a code block, the statements including data processing operations, the method comprising:

maintaining a queue that includes a translatable portion comprising indications of data processing operations translatable to data queries and a non-translatable portion comprising indications of non-translatable data processing operations;

determining that a first data processing operation of a first code block statement is translatable to a database query;

including an indication of the first data processing operation in the translatable portion of the queue;

responsive to a determination that a second data processing operation of a second code block statement is undeferrable, compiling the translatable portion of the queue into a database query;

causing the database query to be executed by a database engine to generate a query result; and transmitting a result dataset corresponding to the query result to an application configured to analyze the result dataset.

11. The method of claim 10, further comprising:

determining that a third data processing operation of a third code block statement is translatable to a database query, the third code block statement subsequent to the first code block statement and preceding the second code block statement, the third data processing operation dependent on an execution of the first data processing operation; and including an indication of the third data processing operation in the translatable portion of the queue, the indication indicating that the third data processing operation is dependent on the execution of the first data processing operation.

12. The method of claim 10, further comprising:

determining that a third data processing operation of a third code block statement is not translatable to a database query, the third code block statement subsequent to the first code block statement and preceding the second code block statement; and including an indication of the third data processing operation in the non-translatable portion of the queue.

13. The method of claim 12, wherein said determining that the third data processing operation is not translatable to a database query is based on at least one of:

a function of the third data processing operation not being translatable to an operator of a database query; or an argument of the third data processing operation not being translatable to an operand of a database query.

14. The method of claim 12, further comprising:

causing the third data processing operation to be executed by a data processing engine to generate a first data processing result; and generating the result dataset based on the query result and the first data processing result.

15. The method of claim 12, further comprising:

determining that a fourth data processing operation of a fourth code block statement is not translatable to a database query, the fourth code block statement subsequent to the third code block statement and preceding the second code block statement, the fourth data processing operation dependent on an execution of the third data processing operation;

including an indication of the fourth data processing operation in the non-translatable portion of the queue, the indication indicating that the third data processing operation is dependent on the execution of the third data processing operation;

causing the fourth data processing operation to be executed by the data processing engine to generate a second data processing result; and updating the result dataset based on the second data processing result.

16. The method of claim 10, further comprising:
- identifying, in one or more queues that includes the queue, a common indication that occurs more than a predetermined number of times, wherein the indication of the first data processing operation is a first instance of the common indication;
- generating a common table indication corresponding to the common indication; and
- mapping the common table indication to each instance of the common indication in the one or more queues.

17. The method of claim 16, wherein said compiling the portion of the queue into a database query comprises:
- parsing the queue to identify each instance of the common indication included in the queue;
- replacing each identified instance of the common indication in the queue with the common table indication; and
- generating the database query corresponding to the queue having the instances of the common indication in the queue replaced with the common table indication.

18. The method of claim 10, further comprising:
- enabling a library to be imported into a computer program under development, the library including an operation evaluator and an engine interface; and
- based on the importing, enabling code of the library to be referenced within the computer program under development to cause data processing operations to be included in the queue by the operation evaluator, to cause the translatable data portion of the queue to be compiled into the database query by the operation evaluator, and to cause the engine interface to cause the database query to be executed by the database engine to generate the query result.

19. A computer-readable storage medium having programming instructions encoded thereon that are executable by one or more processors to perform a method for processing a sequence of statements of a code block, the statements including data processing operations, the method comprising:
- maintaining a queue that includes a translatable portion comprising indications of data processing operations translatable to data queries and a non-translatable portion comprising indications of non-translatable data processing operations;
- determining that a first data processing operation of a first code block statement is translatable to a database query;
- including an indication of the first data processing operation in the translatable portion of the queue;
- responsive to a determination that a second data processing operation of a second code block statement is undeferrable, compiling the translatable portion of the queue into a database query;
- causing the database query to be executed by a database engine to generate a query result; and
- transmitting a result dataset corresponding to the query result to an application configured to analyze the result dataset.

20. The computer-readable storage medium of claim 19, the method further comprising:
- determining that a third data processing operation of a third code block statement is not translatable to a database query, the third code block statement subsequent to the first code block statement and preceding the second code block statement;
- including an indication of the third data processing operation in the non-translatable portion of the queue;
- causing the third data processing operation to be executed by a data processing engine to generate a first data processing result; and
- generating the result dataset based on the query result and the first data processing result.

* * * * *